United States Patent
Woon et al.

(10) Patent No.: US 11,198,431 B2
(45) Date of Patent: Dec. 14, 2021

(54) OPERATIONAL RISK ASSESSMENT FOR AUTONOMOUS VEHICLE CONTROL

(71) Applicant: Retrospect Technology, LLC, Ann Arbor, MI (US)

(72) Inventors: Michael Woon, Ypsilanti, MI (US); Michael Glenn Diaz, Ann Arbor, MI (US)

(73) Assignee: Retrospect Technology, LLC

( * ) Notice: Subject to any disclaimer, the term of this patent is extended or adjusted under 35 U.S.C. 154(b) by 34 days.

(21) Appl. No.: 16/399,901

(22) Filed: Apr. 30, 2019

(65) Prior Publication Data
US 2020/0346641 A1    Nov. 5, 2020

(51) Int. Cl.
*B60W 30/09*    (2012.01)
*G06K 9/00*    (2006.01)
(Continued)

(52) U.S. Cl.
CPC ........ *B60W 30/09* (2013.01); *B60W 30/0956* (2013.01); *G05D 1/0088* (2013.01);
(Continued)

(58) Field of Classification Search
CPC ........ G01C 21/00; G01C 21/26; G01C 21/34; G01C 21/3617; G01C 21/3446; G01C 21/3492; G05D 1/00; G05D 1/0088; G05D 2201/0213; B60W 30/00; B60W 30/09; B60W 30/0956; B60W 10/00;
(Continued)

(56) References Cited

U.S. PATENT DOCUMENTS 8,437,890 B2 *    5/2013    Anderson ............. B60W 50/10
                                                    701/3
10,023,187 B2    7/2018    Wulf
(Continued)

FOREIGN PATENT DOCUMENTS

WO    2017127596 A1    7/2017

OTHER PUBLICATIONS

Non-Final Office Action for U.S. Appl. No. 16/404,208, dated Feb. 3, 2021.
Amendment in U.S. Appl. No. 16/404,208, filed Jul. 6, 2021.

*Primary Examiner* — Yonel Beaulieu
(74) *Attorney, Agent, or Firm* — Young Basile Hanlon & MacFarlane, P.C.

(57) ABSTRACT

Changes in the controlling of an autonomous vehicle are caused based on an operational risk determined for the autonomous vehicle. An operational risk monitor module of the autonomous vehicle uses information about objects detected within an environment in which the autonomous vehicle is located and predicted behaviors of those objects to assess the operational risk of the autonomous vehicle along a planned path. The operational risk is used to determine whether to cause a change in the controlling of the autonomous vehicle, for example, based on a comparison between the operational risk and a previously estimated operational risk or based on a determination that the operational risk exceeds a threshold. The operational risk monitor module transmits a signal to one or more control system modules of the autonomous vehicle to indicate to change the controlling of the autonomous vehicle based on the operational risk.

20 Claims, 10 Drawing Sheets

(51) Int. Cl.
  *G05D 1/00* (2006.01)
  *B60W 30/00* (2006.01)
  *B60W 30/095* (2012.01)

(52) U.S. Cl.
  CPC ..... G06K 9/00805 (2013.01); G06K 9/00825 (2013.01); *G05D 2201/0213* (2013.01)

(58) Field of Classification Search
  CPC ...... B60W 10/18; B60W 40/00; B60W 40/04; G06K 9/00; G06K 9/00825; G06K 9/00805; G08G 1/00; G08G 1/16; G06F 17/00
  See application file for complete search history.

(56) References Cited

U.S. PATENT DOCUMENTS

| | | | | |
|---|---|---|---|---|
| 10,482,226 | B1* | 11/2019 | Konrardy | G05D 1/0212 |
| 10,599,155 | B1* | 3/2020 | Konrardy | B60W 60/0011 |
| 10,824,145 | B1* | 11/2020 | Konrardy | G05D 1/0255 |
| 2007/0299610 | A1* | 12/2007 | Ewerhart | B60T 7/22 |
| | | | | 701/301 |
| 2010/0007728 | A1* | 1/2010 | Strauss | B60W 50/16 |
| | | | | 348/118 |
| 2011/0190972 | A1 | 8/2011 | Timmons et al. | |
| 2012/0109610 | A1* | 5/2012 | Anderson | B60W 50/0098 |
| | | | | 703/8 |
| 2012/0316769 | A1* | 12/2012 | Gagliardi | G08G 3/02 |
| | | | | 701/300 |
| 2014/0032017 | A1* | 1/2014 | Anderson | G05D 1/00 |
| | | | | 701/3 |
| 2015/0025917 | A1* | 1/2015 | Stempora | G06K 9/0061 |
| | | | | 705/4 |
| 2017/0139411 | A1 | 5/2017 | Hartung et al. | |
| 2017/0234689 | A1* | 8/2017 | Gibson | G05D 1/0061 |
| | | | | 701/25 |
| 2018/0089911 | A1 | 3/2018 | Rath et al. | |
| 2019/0054937 | A1* | 2/2019 | Graetz | G05D 1/0094 |
| 2019/0325580 | A1* | 10/2019 | Lukac | G06T 3/4038 |
| 2020/0346641 | A1* | 11/2020 | Woon | B60W 60/0011 |
| 2020/0346643 | A1* | 11/2020 | Woon | B60W 60/0027 |

\* cited by examiner

OPERATIONAL RISK ASSESSMENT FOR AUTONOMOUS VEHICLE CONTROL

TECHNICAL FIELD

This disclosure relates to operational risk assessment for autonomous vehicle control, in particular, to causing changes in the controlling of an autonomous vehicle based on an operational risk determined for the autonomous vehicle.

BACKGROUND

Conventional autonomous vehicle control systems rely on continuously or otherwise periodically collected sensor information to generate a current understanding of the environment in which the autonomous vehicle is located. Based on the current understanding of the environment, the control system of an autonomous vehicle decides how to operate the autonomous vehicle, for example, by controlling the autonomous vehicle to accelerate, come to a complete stop, adjust a direction of movement, or otherwise behave in accordance with traffic safety laws.

SUMMARY

Disclosed herein are, inter alia, implementations of systems and techniques for operational risk assessment for autonomous vehicle control.

In one implementation, a method for controlling an autonomous vehicle based on an operational risk determined for the autonomous vehicle is provided. The method includes receiving input information indicating one or more objects detected within an environment in which the autonomous vehicle is located and one or more object predictions representing expected behaviors of the one or more objects. A planned path representing an intended sequence of actions for the autonomous vehicle to travel within the environment in which the autonomous vehicle is located is identified. The operational risk for the autonomous vehicle is determined based on the input information and based on the planned path. The operational risk represents a probability that the autonomous vehicle will encounter an event. A determination is made as to whether the operational risk for the autonomous vehicle is greater than a previous operational risk estimation for the autonomous vehicle. The previous operational risk estimation represents an operational risk estimation for the autonomous vehicle based on the planned path and based on previous input information. Responsive to determining that the operational risk for the autonomous vehicle is greater than the previous operational risk estimation, a signal used for controlling the autonomous vehicle is generated. The signal is transmitted to one or more control system modules of the autonomous vehicle to cause the one or more control system modules to control the autonomous vehicle by performing a remedial action to prevent the autonomous vehicle from encountering the event.

In another implementation, a system for controlling an autonomous vehicle based on an operational risk determined for the autonomous vehicle is provided. The system includes an operational risk monitor module and a memory buffer. The operational risk monitor module uses information received from control system modules of the autonomous vehicle to determine an operational risk for the autonomous vehicle along a planned path and to indicate a remedial action for performance using one or more of the control system modules based on the operational risk and based on a previous operational risk estimation for the planned path. The memory buffer is allocated within a memory of a computing device running the operational risk monitor module. The memory buffer stores the information received from the control system modules, information indicative of previous operational estimations determined using the operational risk monitor module, and information indicative of scenes previously synthesized for the planned path. The information received from the control system modules includes information indicative of one or more objects detected within an environment in which the autonomous vehicle is located, information indicative of one or more object predictions representing expected behaviors of the one or more objects, and information indicative of one or more planned paths including the planned path. The operational risk monitor module determines the operational risk for the autonomous vehicle along the planned path by updating a scene previously synthesized for the planned path according to the one or more objects and according to the one or more object predictions.

In yet another implementation, an apparatus for controlling an autonomous vehicle based on an operational risk determined for the autonomous vehicle is provided. The apparatus includes a memory and a processor. A first portion of the memory stores instructions and a second portion of the memory is allocated for a buffer. The processor is configured to execute the instructions stored in the memory. The instructions include instructions to determine an operational risk for the autonomous vehicle along a planned path representative of an intended sequence of actions for the autonomous vehicle to travel within an environment in which the autonomous vehicle is located. The instructions further include instructions to retrieve data indicative of a previous operational risk estimation for the planned path from the buffer. The instructions further include instructions to compare the operational risk against the previous operational risk estimation to determine whether the operational risk is greater than the previous operational risk. The instructions further include instructions to, responsive to a determination that the operational risk is greater than the previous operational risk, generate a signal indicating an operational risk underestimation. The instructions further include instructions to transmit the signal to a control system module of the autonomous vehicle to cause the control system module to perform a remedial action to prevent the autonomous vehicle from encountering an event associated with the operational risk.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
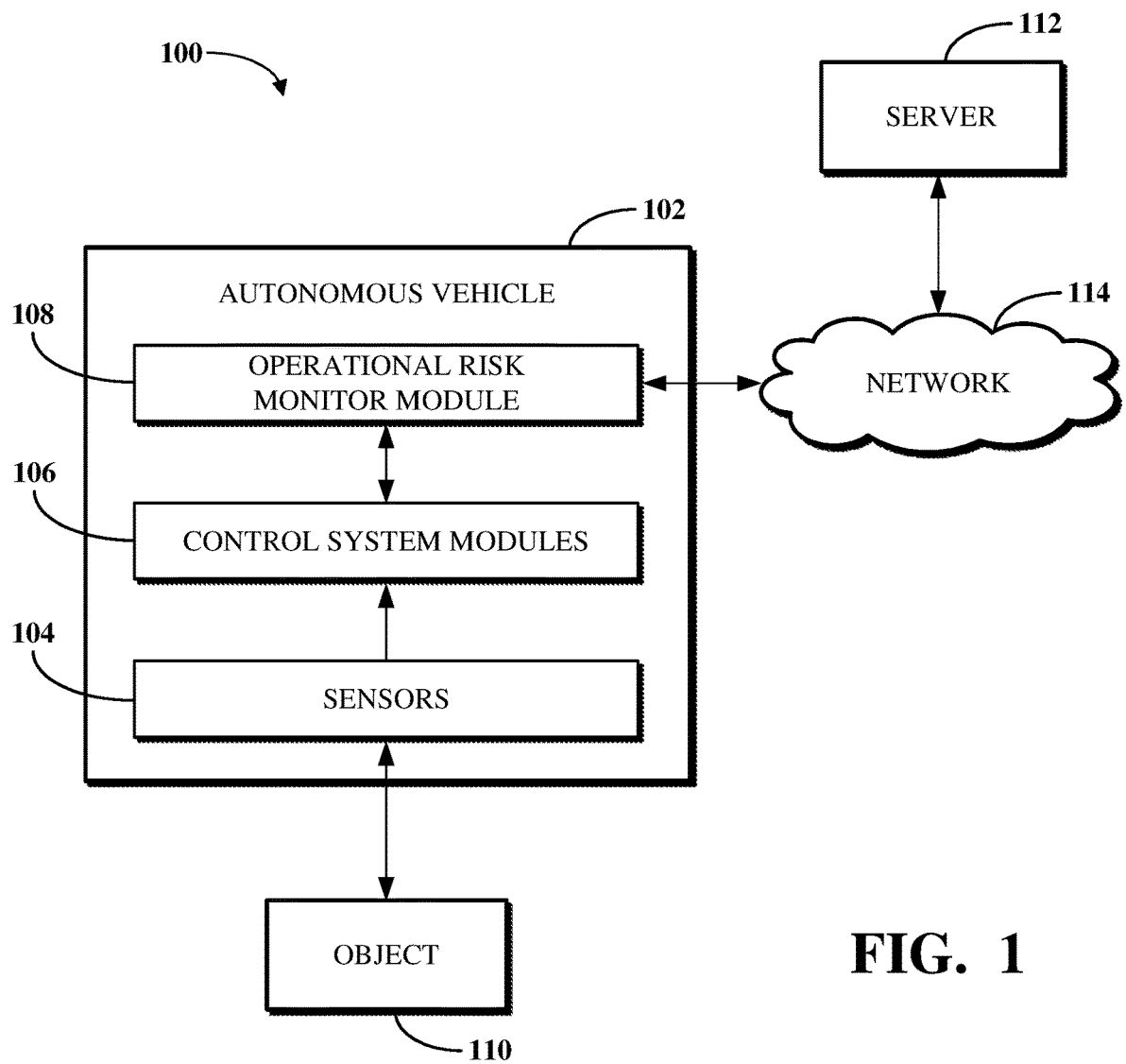
FIG. 1 is a block diagram showing an example of a system for operational risk assessment for autonomous vehicle control.

Conventional autonomous vehicle control systems determine a current path for controlling a vehicle by perceiving information detected about an environment in which the vehicle is located and predicting how that information will affect the operation of the vehicle. However, changes in operational risk for a given planned path, which includes or otherwise refers to the assessed risk along a previous planned path based on perceived and predicted information within the environment of the vehicle, are not considered. Instead, conventional autonomous vehicle control systems are limited to performing current analyses of operational risk for a current planned path without regard to current analyses of operational risk for previous planned paths. The failure to consider changes in operational risk for previous planned paths may, in some cases, result in the failure to diagnose or detect faults in the autonomous vehicle system that cause the autonomous vehicle system to underestimate the operational risk of the vehicle. Underestimating the operational risk of an autonomous vehicle presents potential issues in allowing the autonomous vehicle to encounter events which may, in some cases, be hazardous, such as where the event may cause injury or damage. The failure to diagnose or detect faults which underestimate the operational risk for the autonomous vehicle increases the exposure of the autonomous vehicle to potential hazards. Further, this may in some cases violate functional safety compliance. Conventional autonomous vehicle control systems thus fail to validate and generate evidence of safety.

Implementations of this disclosure address problems such as these by causing changes in the controlling of an autonomous vehicle based on an operational risk determined for the autonomous vehicle. An operational risk monitor module of the autonomous vehicle uses information about objects detected within an environment in which the autonomous vehicle is located and predicted behaviors of those objects to assess the operational risk of the autonomous vehicle along a planned path. The operational risk is used to determine whether to cause a change in the controlling of the autonomous vehicle, for example, based on a comparison between the operational risk and a previously estimated operational risk or based on a determination that the operational risk exceeds a threshold. The operational risk monitor module transmits a signal to one or more control system modules of the autonomous vehicle to indicate to change the controlling of the autonomous vehicle based on the operational risk.

The operational risk monitor module can use a systematic monitor, a heuristic monitor, and/or a sensitivity monitor to determine to cause the changes in the controlling of the autonomous vehicle. The systematic monitor performs continuous or otherwise frequent and periodic monitoring of operating conditions of the autonomous vehicle and of conditions of the environment in which the autonomous vehicle is located, such as to compare operational risks determined at given times against previous values. For example, the systematic monitor functionality can be used to determine that a change in the controlling of the autonomous vehicle is necessary when a current operational risk estimate for a given planned path exceeds a previous operational risk estimation for that planned path. The heuristic monitor applies rules used by the systematic monitor against current conditions of the autonomous vehicle and of the environment in which the autonomous vehicle is located to determine whether a rule is violated. For example, a rule may indicate that all objects should be initially detected within a specific distance of the front of the autonomous vehicle while the autonomous vehicle is traveling forward. The rule violation can be determined and used to cause a change in the controlling of the autonomous vehicle. The operational risk monitor module may be further configured to use a combination of the systematic monitor, the heuristic monitor, and/or the sensitivity monitor simultaneously. Using a combination of the systematic monitor, heuristic monitor, and/or the sensitivity monitor broadens the scope of system issues which can be detected, thereby further improving a time-to-detection of hazardous and non-hazardous events.

As used herein, operational risk refers to a calculated estimate associated with a given operation, which may be based on or otherwise account for estimated costs of potential outcomes associated with the given operation, estimates of likelihood of such potential outcomes, and/or proxies or other indicators of such aggregated risk estimates, estimated costs, and/or such likelihood. Costs for a potential outcome may, for example, include or otherwise account for those costs that may be borne by the vehicle itself, occupants of the vehicle, and/or the environment of the vehicle and/or objects therein (e.g., other vehicles, pedestrians, and/or other objects around the vehicle). Costs may refer to events the autonomous vehicle is expected to encounter. The events are associated with operational risks, for example, in which an operational risk represents a probability that the event will occur and/or a severity of the event. An event can be a hazardous event or a non-hazardous event. A hazardous event refers to an event which results in or has the potential to result in injury to person and/or damage to property. A non-hazardous event refers to an event which does not result or have the potential to result in injury to person and/or damage to property. As non-limiting illustrative examples, a hazardous event may be a collision involving the autonomous vehicle, the autonomous vehicle losing contact with the surface of the road on which it travels, or the like. In other non-limiting illustrative examples, a non-hazardous event may be the autonomous vehicle driving onto rumble strips, driving through a pooling of water, or the like. As non-limiting illustrative examples, a low operational risk estimate may be calculated when the vehicle is moving at 5 mph and a leaf is identified 500 feet ahead, since the potential costs are low (e.g., impact with a tree leaf at 5 mph would not damage the vehicle and damage to the leaf is of no cost) and the likelihood of impact with the leaf is low (e.g., at 5 mph the vehicle has sufficient time to maneuver to avoid the leaf and/or the leaf may blow away before the vehicle arrives). In other non-limiting illustrative examples, a high operational risk estimate may be calculated when the vehicle 102 is moving at 70 mph and another vehicle is identified 80 feet ahead, since the potential costs are higher (e.g., impact of the two vehicles at 70 mph may result in high costs borne by the vehicles and/or occupants thereof) and the likelihood of impact is higher (e.g., given the speed, distance, and size of the vehicle ahead). These examples additionally illustrate that the operational risk may be determined, estimated, or otherwise calculated in different manners, which may, but need not, include estimates of costs based on a severity of an event associated with the operational risk and/or estimates of probability of an encounter with an event arising (e.g., being based on speed of the vehicle and/or identification of obstacles).

As used herein, the environment in which the autonomous vehicle is located includes or otherwise refers to a geographical location of the autonomous vehicle and contextual information relevant for a control system of the autonomous vehicle to understand how to operate the autonomous vehicle at that geographical location (e.g., traffic control devices, buildings, etc.).

To describe some implementations in greater detail, reference is first made to examples of hardware and software structures used to implement a system for operational risk assessment for autonomous vehicle control. FIG. 1 is a block diagram showing an example of a system 100 for operational risk assessment for autonomous vehicle control. The system 100 includes an autonomous vehicle 102 which is controlled using modules and components. The autonomous vehicle 102 includes sensors 104, control system modules 106, and an operational risk monitor module 108.

The sensors 104 detect an object 110 within an environment in which the autonomous vehicle 102 is located. The sensors 104 are hardware units used to measure or otherwise record information about the environment in which the autonomous vehicle 102 is located. The sensors 104 may also include software used by those hardware units, such as to control the operation of those hardware units. The sensors 104 may include a radar sensor, a LIDAR sensor, an image sensor (e.g., a camera), another sensor, multiples of one or more of the foregoing sensor types, or a combination thereof. For example, the sensors 104 may include a LIDAR sensor, multiple image sensors arranged to capture a 360 degree view around the autonomous vehicle, a front radar sensor, and a rear radar sensor.

The object 110 represents organic or inorganic matter located within the environment in which the autonomous vehicle 102 is located. For example, the object 110 may be a pedestrian, a vehicle, a street sign, a wall, a traffic control device, an animal, a tree, multiples of one or more of the foregoing object types, or a combination thereof.

The control system modules 106 process the output of the sensors 104. The control system modules 106 include software which receives the information measured or otherwise recorded using the sensors 104 to determine how to control the autonomous vehicle 102 and to control the autonomous vehicle 102 accordingly. For example, the control system modules 106 may include, but are not limited to, one or more of an onboard navigation module, a localization module, a control constraints module, a perception module, a prediction module, a planning module, a platform control module, another module, or a combination thereof. The control system modules 106 are run on a computing device of the autonomous vehicle 102.

The operational risk monitor module 108 uses information from the control system modules 106 to assess an operational risk for the autonomous vehicle 102. The operational risk monitor module 108 receives input information from the control system modules 106 indicating one or more objects (e.g., the object 110) detected within an environment in which the autonomous vehicle 102 is located and one or more object predictions representing expected behaviors of those detected objects. The operational risk monitor module 108 further identifies planned paths determined using the control system modules 106, which planned paths represent intended sequences of actions to be used for the autonomous vehicle 102 to travel within the environment in which the autonomous vehicle 102 is located.

The operational risk monitor module 108 uses the information about the detected objects and the object predictions, and planned paths to determine an operational risk for the autonomous vehicle along the planned paths. The operational risk monitor module 108 then processes the determined operational risk to determine whether a remedial action should be performed, for example, by aborting operations within the environment in which the autonomous vehicle 102 is located to avoid an event which the autonomous vehicle 102 is expected to encounter or to otherwise reduce the probability that the autonomous vehicle 102 will encounter that event. For example, the remedial action may include, but is not limited to, a safe stop, a safe pullover, a blind pullover, a speed reduction, a teleoperation-related control, or another immediate action, which may, for example, be pending human analysis of the determined operational risk.

Where a determination is made that a remedial action should be performed, the operational risk monitor module 108 transmits a signal indicating or otherwise used to indicate the remedial action to the control system modules 106. The control system modules 106 then cause the performance of the remedial action based on the signal received from the operational risk monitor module 108. For example, where the operational risk monitor module 108 determines that the autonomous vehicle 102 is not sufficiently estimating the operational risk associated with the previous planned paths, the remedial action may indicate to follow only the last planned path and to stop the execution of future planned paths of the autonomous vehicle 102. The operational risk monitor module 108 generates a signal indicating the command to stop execution and transmits that signal to the control system modules 106. The control system modules 106 then stop the autonomous vehicle 102 according to the signal.

Alternatively, where a determination is made that a remedial action does not need to be performed, such as because the operational risk determined for the current planned path is low or otherwise does not merit the performance of such an action, the operational risk monitor module 108 transmits a signal indicating to allow the autonomous vehicle 102 to maintain a safe state, for example by allowing the autonomous vehicle 102 to continue traveling along the current planned path or future planned paths within the environment in which the autonomous vehicle 102 is located.

The operational risk monitor module 108 can use a systematic monitor and/or a heuristic monitor. The systematic monitor represents functionality of the operational risk monitor module 108 for systematically comparing the current operational risk for a previous planned path received from the control system modules 106 against the previous operational risk estimation, which was previously determined for a planned path previously received from the control system modules 106. The heuristic monitor represents functionality of the operational risk monitor module 108 for using configurable rules to detect that an operational risk determined based on input information exceeds a threshold representing a maximum acceptable risk for the autonomous vehicle. That is, the heuristic monitor evaluates inputs used to determine a planned path which can cause future operational risk estimates to rise, for example, where a fault in prior input information could cause an operational risk to be underestimated. The particular approach used by the operational risk monitor module 108 can be defined during the deployment of the operational risk monitor module 108 to a computer of the autonomous vehicle 108. Alternatively, or additionally, the approach used by the operational risk monitor 108 can be changed after the deployment of the operational risk monitor module 108 to the computer of the autonomous vehicle.

A server 112 communicates with one or more computing aspects of the autonomous vehicle 102 over a network 114. The server 112 may be or include a hardware server (e.g., a server device), a software server (e.g., a web server and/or a virtual server), or both. For example, where the server 112 is or includes a hardware server, the server 112 may be a computing device located at a remote operating center used to manage the operations of the autonomous vehicle 102 (and/or a fleet of autonomous vehicles including the autonomous vehicle 102) or a server device located in a rack, such as of a data center. The network 114 is a network used to communicate information between a computing aspect of the autonomous vehicle 102 and the server 112. The network 114 may, for example, be a local area network, a wide area network, a machine-to-machine network, a virtual private network, or another public or private network.

The server 112 may receive information associated with the operational risk determined using the operational risk monitor module 108, a signal generated using the operational risk monitor module 108, or other information processed by or at the operational risk monitor module 108. For example, that information can be reported to the server 112 for logging. The information logged at the server 112 may be used to further configure or update configurations of the operational risk monitor module 108. For example, the information logged at the server 112 may be processed using pattern recognition or other intelligence software to determine whether false positives, false negatives, or other misunderstood features are present within a particular location through which the autonomous vehicle has traveled. That information can be analyzed and then used to update an intelligence system of the autonomous vehicle, for example, by training the control system modules 106 and/or the operational risk monitor module 108 to more accurately detect and understand aspects about the environment in which the autonomous vehicle is located.

Implementations of the system 100 may differ from what is shown and described with respect to FIG. 1. In some implementations, the system 100 may omit the server 112 and/or the network 114. For example, data indicative of how the operational risk monitor module 108 is used may be locally stored within a computing device of the autonomous vehicle 102 itself. The data can be retrieved directly from the computing device. In another example, data indicative of how the operational risk monitor module 108 is used may not be stored.

In some implementations, where a determination is made that a remedial action does not need to be performed, the operational risk monitor module 108 may not transmit a signal to the control system modules 106. For example, the control system modules 106 may be configured to continue controlling the autonomous vehicle 102 along the current planned path unless a signal is received from the operational risk monitor module 108. In such an implementation, the operational risk monitor module 108 may only transmit a signal to the control system modules 106 where a determination is made that a remedial action should be performed.

Figure 2:
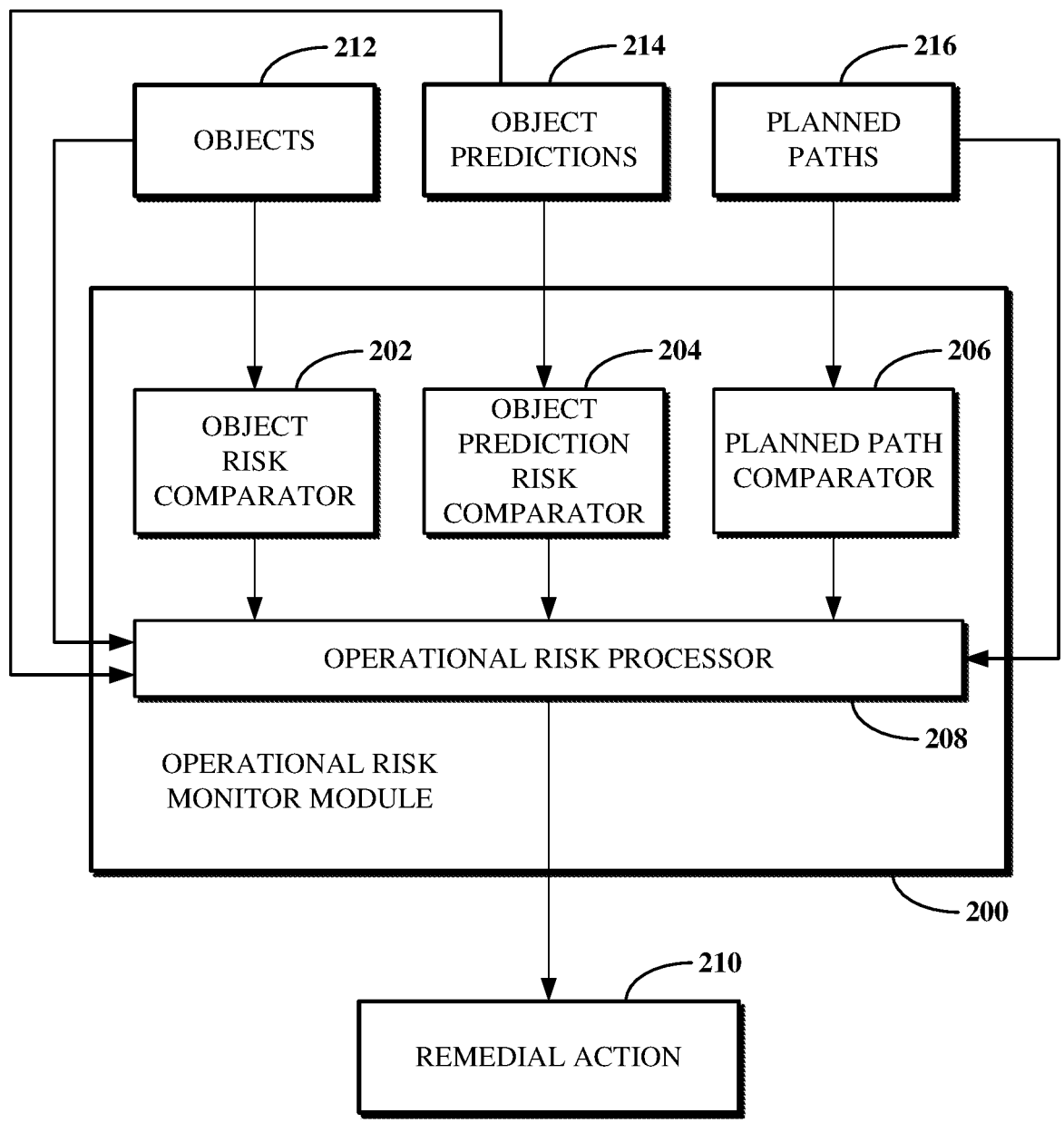
FIG. 2 is a block diagram showing an example of an operational risk monitor module.

FIG. 2 is a block diagram showing an example of an operational risk monitor module 200. The operational risk monitor module 200 may, for example, be the operational risk monitor module 108 shown in FIG. 1. The operational risk monitor module 200 includes an object risk comparator 202, an object prediction risk comparator 204, a planned path comparator 206, and an operational risk processor 208 that uses the output of the object risk comparator 202, the object prediction risk comparator 204, and the planned path comparator 206 to determine a remedial action 210.

The operational risk monitor module 200 uses information about objects 212, object predictions 214, and planned paths 216, received from one or more control system modules of an autonomous vehicle (e.g., the control system modules 106 and the autonomous vehicle 102), to determine the remedial action 210. The operational risk monitor module 200 then transmits a signal to the one or more control system modules to indicate whether and how to change a controlling of the autonomous vehicle.

The object risk comparator 202 receives information about the objects 212, which are objects located within an environment in which an autonomous vehicle using the operational risk monitor module 200 is located. The objects 212 may be or include objects detected within the environment in which the autonomous vehicle is located. The objects 212 may be detected using one or more sensors of the autonomous vehicle (e.g., the sensors 104).

The information about the objects 212 received by the object risk comparator 202 includes a list of objects currently detected within the environment in which the autonomous vehicle is located and a list of objects previously detected within that environment. For example, the objects previously detected within the environment in which the autonomous vehicle is located can be retrieved from a buffer or other memory structure that temporarily stores information used for processing at the operational risk monitor module 200. A list of objects, such as the list of currently detected objects or the list of previously detected objects, may be, include, or otherwise refer to a data set which indicates the objects.

The object risk comparator 202 uses the information about the objects 212 to determine whether the objects currently detected within the environment in which the autonomous vehicle is located present a greater risk to the autonomous vehicle than the objects previously detected within that environment. In particular, the object risk comparator 202 compares the currently detected objects against the previously detected objects to determine whether the risk associated with the currently detected objects being within the environment in which the autonomous vehicle is located is greater than the risk associated with the previously detected objects being within that environment.

For example, the processing by the object risk comparator 202 can be performed to determine whether a number of detected objects has changed over some amount of time (e.g., one second or less), whether the types of detected objects have changed over some amount of time, whether a location of one or more of the detected objects within the environment in which the autonomous vehicle is located has changed over some amount of time, or another change in the objects detected at two different times. The object risk comparator 202 can use rules or definitions of risks to determine whether the currently detected objects present a greater risk to the autonomous vehicle than the previously detected objects.

For example, different objects can be defined to have different risks based on their type and their estimated distance from the autonomous vehicle. In another example, different rules can be used to indicate how the detection of objects should be processed based on, for example, when the object was detected, whether a previously detected object expected to still be within the environment in which the autonomous vehicle is located is no longer detected within that environment, whether the classification of a detected object has changed based on the information about the objects 212, or other criteria.

The rules or definitions of risk used by the object risk comparator 202 may, for example, be determined based on a machine learning model or other machine intelligence approach. For example, a neural network or other structure can be trained according to training data sets representing different objects and their relationships to a vehicle. In another example, the rules or definitions of risk used by the object risk comparator 202 may be determined using a deterministic risk framework other than one based in machine learning. The information modeled based on that training can be used to determine the rules or definitions of risk used by the object risk comparator 202. The rules or definitions of risk used by the object risk comparator 202 may be configurable, for example, by a user of the autonomous vehicle.

The object risk comparator 202 outputs a signal indicating whether the objects currently detected within the environment in which the autonomous vehicle is located present a greater risk to the autonomous vehicle than the objects previously detected within that environment. The signal may, for example, include a flag having a first value when the currently detected objects present a greater risk to the autonomous vehicle than the previously detected objects and having a second value when the currently detected objects do not present a greater risk to the autonomous vehicle than the previously detected objects.

The object prediction risk comparator 204 receives information about the object predictions 214 representing expected behaviors of the objects 212 within the environment in which the autonomous vehicle is located. The information about the object predictions 214 received by the object prediction risk comparator 204 includes a list of object predictions for objects currently detected within the environment in which the autonomous vehicle is located and a list of object predictions for objects previously detected within that environment. For example, the object predictions for the objects previously detected within the environment in which the autonomous vehicle is located can be retrieved from a buffer or other memory structure that temporarily stores information used for processing at the operational risk monitor module 200. A list of object predictions, such as the list of object predictions for the currently detected objects or the list of object predictions for the previously detected objects, may be, include, or otherwise refer to a data set which indicates the object predictions.

The object prediction risk comparator 204 uses the information about the object predictions 214 to determine whether the expected behaviors of the objects currently detected within the environment in which the autonomous vehicle is located present a greater risk to the autonomous vehicle than the expected behaviors of the objects previously detected within that environment. In particular, the object prediction risk comparator 204 compares the expected behaviors of the currently detected objects against the expected behaviors of the previously detected objects to determine whether the risk associated with the expected behaviors of the currently detected objects within the environment in which the autonomous vehicle is located is greater than the risk associated with the expected behaviors of the previously detected objects within that environment.

For example, the processing by the object prediction risk comparator 204 can be performed to determine whether a detected object is expected to move closer to the autonomous vehicle, whether a detected object is expected to remain in the same location within the environment in which the autonomous vehicle is located or leave that environment altogether, whether and how a velocity at which a detected object moves is expected to change within the environment in which the autonomous vehicle is located, or another change in the expected behavior of detected objects. The object prediction risk comparator 204 can use rules or definitions of risks to determine whether the object predictions for the currently detected objects present a greater risk to the autonomous vehicle than the object predictions for the previously detected objects.

For example, different object predictions can be defined to have different risks based on the object to which they relate and the type of behaviors predicted thereby. In another example, different rules can be used to indicate how the object predictions should be processed based on, for example, whether the predicted movement path of a detected object has changed, whether a detected object predicted to remain stationary has instead moved, whether a detected object predicted to move has instead remained stationary, or other criteria, whether the detected object is moving too close to the autonomous vehicle, or other criteria.

The rules or definitions of risk used by the object prediction risk comparator 204 may, for example, be determined based on a machine learning model or other machine intelligence approach. For example, a neural network or other structure can be trained according to training data sets representing different objects and their expected behaviors. In another example, the rules or definitions of risk used by the object prediction risk comparator 204 may be determined using a deterministic risk framework other than one based in machine learning. The information modeled based on that training can be used to determine the rules or definitions of risk used by the object prediction risk comparator 204. The rules or definitions of risk used by the object prediction risk comparator 204 may be configurable, for example, by a user of the autonomous vehicle.

The object prediction risk comparator 204 outputs a signal indicating whether the object predictions for the objects currently detected within the environment in which the autonomous vehicle is located present a greater risk to the autonomous vehicle than the object predictions for the objects previously detected within that environment. The signal may, for example, include a flag having a first value when the object predictions for the currently detected objects present a greater risk to the autonomous vehicle than the object predictions for the previously detected objects and having a second value when the object predictions for the currently detected objects do not present a greater risk to the autonomous vehicle than the object predictions for the previously detected objects.

The planned path comparator 206 receives information about the planned paths 216 representing intended sequences of actions used for the autonomous vehicle to travel within the environment in which the autonomous vehicle is located. The information about the planned paths 216 received by the planned path comparator 206 includes a current planned path for the autonomous vehicle to travel within the environment in which it is located and one or more previously determined planned paths for the autonomous vehicle. For example, the one or more previously determined planned paths for the autonomous vehicle can be retrieved from a buffer or other memory structure that temporarily stores information used for processing at the operational risk monitor module 200. The one or more previously determined planned paths for the autonomous vehicle may be planned paths determined within or less than some amount of time (e.g., one second) of the determining of the current planned path.

The planned path comparator 206 uses the information about the planned paths 216 to determine whether a planned path for the autonomous vehicle has changed. In particular, the planned path comparator 206 compares the current planned path against the one or more previously determined planned paths (e.g., against a most recently determined one of the one or more previously determined planned paths) to determine whether the current planned path is different from the one or more previously determined planned paths. The planned path comparator 206 outputs a signal indicating whether the planned path for the autonomous vehicle has changed. The signal may, for example, include a flag having a first value when the planned path for the autonomous vehicle has changed and having a second value when the planned path for the autonomous vehicle has not changed.

The operational risk monitor module determines the remedial action 210 using a systematic monitor, a heuristic monitor, and/or a sensitivity monitor. For example, where the operational risk processor 208 uses a systematic monitor, the operational risk processor 208 uses the signals output from the object risk comparator 202, the object prediction risk comparator 204, and the planned path comparator 206 to determine the remedial action 210. For example, where the signals output from the object risk comparator 202, the object prediction risk comparator 204, and the planned path comparator 206 are or otherwise include flags, the operational risk processor 208 can use those flags to determine the operational risk for the autonomous vehicle. The operational risk processor 208 can then use that operational risk to determine whether the remedial action 210 should be executed, for example, using one or more control system modules of the autonomous vehicle. In another example, where the operational risk monitor module 200 uses a heuristic monitor, the operational risk processor 208 uses input information including the objects 212 and the object predictions 214 to determine whether a systematic rule used by the systematic monitor functionality of the operational risk monitor module 200 is violated. In yet another example, where the operational risk monitor 200 uses a sensitivity monitor, the operational risk processes uses input information including the objects 212, the object predictions 214, and the planned paths 216 to evaluate previous planned paths based on updated scene information synthesized based on the newly detected objects and object predictions. Implementations and examples for using a systematic monitor, a heuristic monitor, or a sensitivity monitor for autonomous vehicle control are respectively described below with respect to FIGS. 7, 8, and 9.

Implementations of the operational risk monitor module 200 may differ from what is shown and described with respect to FIG. 2. In some implementations, the object prediction risk comparator 204 may also receive the information about the objects 212. For example, the object prediction risk comparator 204 can apply rules against the objects 212 using the object predictions 214 to determine whether a rule violation has occurred. In some implementations, the same machine learning model, other machine intelligence approach, or other deterministic risk framework, or the same combination thereof, can be used by both of the object risk comparator 202 and the object prediction risk comparator 204.

In some implementations, the operational risk processor 208 may perform pre-processing against the input received from the object risk comparator 202, the object prediction risk comparator 204, and the planned path comparator 206. For example, the pre-processing can include determining whether further processing of the input received from the object risk comparator 202, the object prediction risk comparator 204, and the planned path comparator 206 based on the values of that input. For example, the operational risk processor 208 may be configured to stop processing input received from the object risk comparator 202, the object prediction risk comparator 204, and the planned path comparator 206 in some cases.

In some such implementations, the operational risk processor 208 can pre-process the values of the flags output by the object risk comparator 202, the object prediction risk comparator 204, and the planned path comparator 206. For example, the operational risk processor 208 can use the pre-processing functionality thereof to stop further processing by the operational risk processor 208 where the value of the flag output by the object risk comparator 202 indicates that the currently detected objects do not present a greater risk to the autonomous vehicle than the previously detected objects, the value of the flag output by the object prediction risk comparator 204 indicates that the object predictions for the currently detected objects do not present a greater risk to the autonomous vehicle than the object predictions for the previously detected object, and the value of the flag output by the planned path comparator 206 indicates that the current planned path for the autonomous vehicle remains unchanged as compared to the one or more previously determined planned paths. Where the operational risk processor 208 stops further processing, the remedial action 210 is not produced, and the operational risk monitor module 200 does not cause a change in the controlling of the autonomous vehicle.

Figure 3:
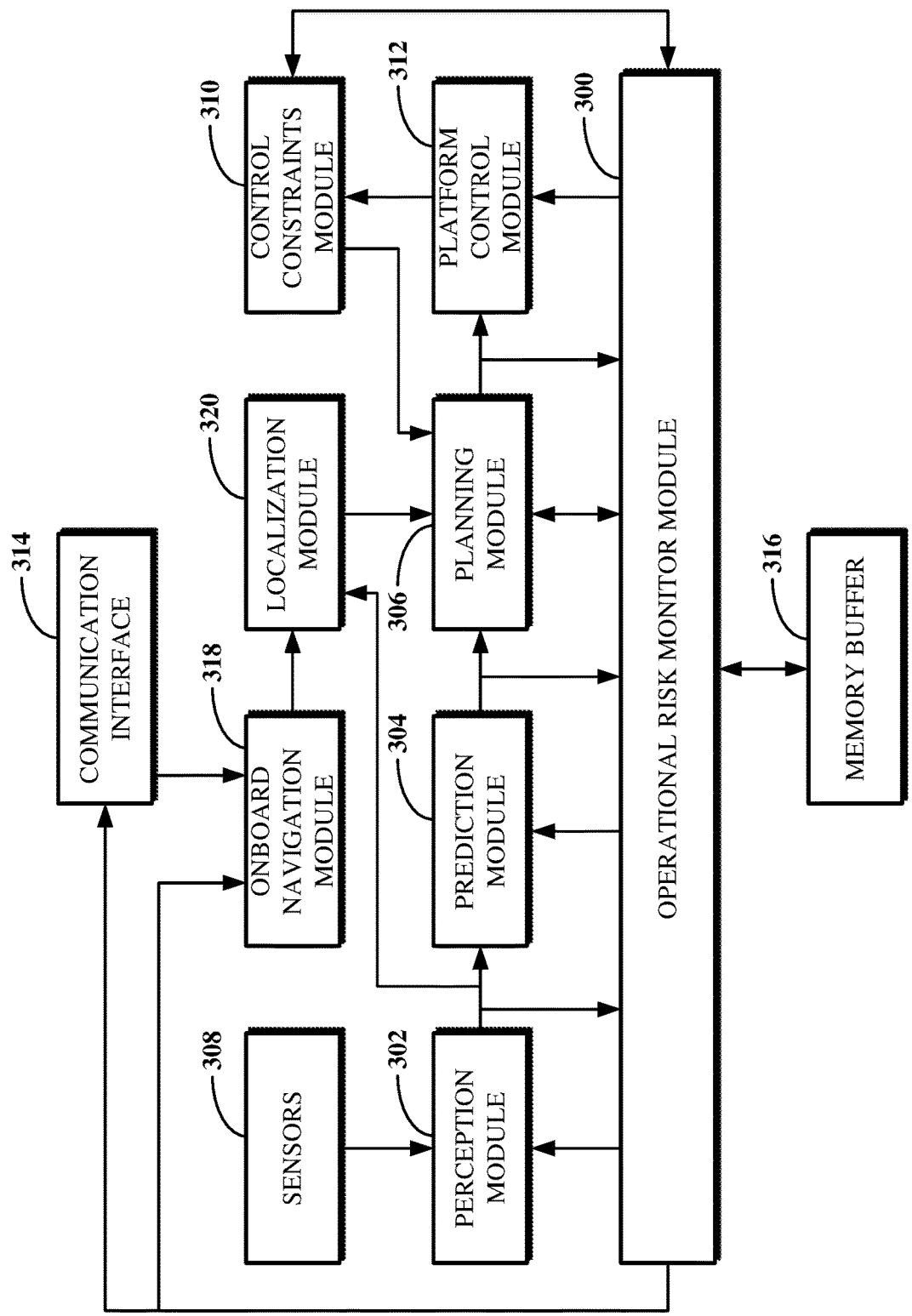
FIG. 3 is a block diagram showing examples of modules and components used for operational risk assessment for autonomous vehicle control.

FIG. 3 is a block diagram showing examples of modules and components used for operational risk assessment for autonomous vehicle control. The modules and components shown in FIG. 3 include or otherwise refer to software and hardware of an autonomous vehicle (e.g., the autonomous vehicle 102 shown in FIG. 1), which are used to monitor the environment in which the autonomous vehicle is located and control the autonomous vehicle based on the monitoring. The modules and components shown in FIG. 3 are included in or otherwise refer to aspects of the autonomous vehicle 102 shown in FIG. 1, including the sensors 104, the control system modules 106, and the operational risk monitor module 108.

As shown, an operational risk monitor module 300, which may, for example, be the operational risk monitor module 200 shown in FIG. 2, receives signals output from each of a perception module 302, a prediction module 304, and a planning module 306. The perception module 302 is a control system module (e.g., of the control system modules 106) which processes information measured or otherwise recorded using sensors 308 (e.g., the sensors 104) to detect objects within an environment in which the autonomous vehicle is located. The signal output by the perception module 302 is or includes information about objects, for example, the objects 212 shown in FIG. 2.

The prediction module 304 is a control system module (e.g., of the control system modules 106) which processes information about the objects detected using the perception module 302 to determine object predictions for those objects. The signal output by the prediction module 304 is or includes information about object predictions, for example, the object predictions 214 shown in FIG. 2.

The planning module 306 is a control system module (e.g., of the control system modules 106) which processes information received from a control constraints module 310 (e.g., of the control system modules 106) along with the object predictions determined using the prediction module 304 to determine planned paths for the autonomous vehicle. The signal output by the planning module 306 is or includes information about planned paths, for example, the planned paths 216 shown in FIG. 2.

The operational risk monitor module 300 uses systematic monitoring, heuristic monitoring, and/or sensitivity monitoring to evaluate changes in operational risk for the autonomous vehicle. With systematic monitoring, the operational risk monitor module 300 uses the signals output by the perception module 302, the prediction module 304, and the planning module 306 to determine an operational risk for the autonomous vehicle and further to determine whether and how to cause a change in the controlling of the autonomous vehicle based on that operational risk. With heuristic monitoring, the operational risk monitor module 300 uses information taken as input to the planning module 306 to determine whether a planned path produced using that information could cause future operational risk estimates to exceed a threshold. With sensitivity monitoring, the operational risk monitor module 300 determines whether perturbations to a planned path cause the operational risk to increase enough to merit the performance of a remedial action. The operational risk monitor module 300 generates a signal indicating whether and how to cause a change in the controlling of the autonomous vehicle based on the determined operational risk to a platform control module 312 (e.g., of the control system modules 106).

The platform control module 312 represents functionality for the autonomous vehicle used to control the autonomous vehicle based on the signal output by the operational risk monitor module 300. For example, the platform control module 312 can generate one or more actuator outputs for use in controlling aspects of the autonomous vehicle based on the signal received from the operational risk monitor module 300.

For example, the signal transmitted to the platform control module 312 from the operational risk monitor module 300 can be or include a control abort command that the platform control module 312 uses to perform an emergency stop of the autonomous vehicle. In another example, the signal transmitted to the platform control module 312 from the operational risk monitor module 300 can be or include a velocity change command that the platform control module 312 uses to change a current speed of the autonomous vehicle. In yet another example, the signal transmitted to the platform control module 312 from the operational risk monitor module 300 can be or include a validation signal that the platform control module 312 uses to keep the autonomous vehicle traveling along its current planned path.

The operational risk monitor module 300 can also transmit other signals to different control system modules of the autonomous vehicle. For example, the operational risk monitor module 300 can transmit a signal indicating a perception incident flag to the perception module 302, such as to alert the perception module 302 as to a determination by the operational risk monitor module 300 that an object detected within the environment in which the autonomous vehicle is located presents an incident risk to the autonomous vehicle. The incident risk indicated using the perception incident flag is a first incident risk representing a risk of an incident associated with an object. In another example, the operational risk monitor module 300 can transmit a signal indicating a prediction incident flag to the prediction module 304, such as to alert the prediction module 304 as to a determination by the operational risk monitor module 300 that an expected behavior of an object detected within the environment in which the autonomous vehicle is located presents an incident risk to the autonomous vehicle. The incident risk indicated using the prediction incident flag is a second incident risk representing a risk of an incident associated with an object prediction.

In another example, the operational risk monitor module 300 can transmit a signal indicating information to be reported or stored remotely to a communication interface 314. The communication interface 314 is a hardware component of the autonomous vehicle which is used to communicate interface over a network to one or more remote computers (e.g., a server or other computer at a remote operating center). The communication interface 314 communicates using one or more network protocols, such as using Ethernet, TCP, IP, power line communication, Wi-Fi, Bluetooth®, infrared, GPRS, GSM, CDMA, Z-Wave, ZigBee, another protocol, or a combination thereof.

In another example, the operational risk monitor module 300 can transmit a platform control constraints flag to the control constraints module 310, such as to cause the control constraints module 310 to change one or more platform control constraints of the autonomous vehicle. For example, the platform control constraints flag can indicate to adjust one or more constraints and/or the priorities of those constraints used for an operational aspect of the autonomous vehicle, such as a propulsion system of the autonomous vehicle, a braking system of the autonomous vehicle, or another system of the autonomous vehicle. In some cases, the operational risk monitor module 300 can receive a signal directly from the control constraints module 310, for example, for use in determining the operational risk for the autonomous vehicle and/or for use in determining whether and how to cause a change in the controlling of the autonomous vehicle based on that operational risk.

The operational risk monitor module 300 uses information stored in a memory buffer 316 to determine an operational risk for the autonomous vehicle and further to determine whether and how to cause a change in the controlling of the autonomous vehicle based on that operational risk. The memory buffer 316 stores information about objects, object predictions, and planned paths, respectively received from the perception module 302, the prediction module 304, and the planning module 306, as previously detected objects, previously determined object predictions, and previously determined planned paths. The operational risk monitor module 300 retrieves the previously detected objects, previously determined object predictions, and previously determined planned paths from the memory buffer 316 as necessary.

The memory buffer 316 stores the information about the previously detected objects, previously determined object predictions, and previously determined planned paths for a limited amount of time, such as according to an eviction policy for the memory buffer 316. The eviction policy for the memory buffer 316 may be fixed or configurable. Upon the expiration of the time set by the eviction policy for given data, the memory buffer 316 deletes the given data, such as to prepare space for storing new data received from perception module 302, the prediction module 304, and the planning module.

The control system modules may include other modules used for controlling aspects of the autonomous vehicle. For example, an onboard navigation module 318 can be used to indicate geographical information about the location of the autonomous vehicle. In another example, a localization module 320 can use a navigation waypoint command (e.g., indicating the geographical information) output from the onboard navigation module along with information about objects detected within an environment in which the autonomous vehicle is located (e.g., as output by the perception module 302) to classify and determine the location of the autonomous vehicle. A localized waypoint command (e.g., including information about the classified and determined location of the autonomous vehicle) may then be made available, for example, to the control constraints module 310.

Implementations of the modules and components used for operational risk assessment for autonomous vehicle control may differ from what is shown and described with respect to FIG. 3. In some implementations, information determined at and/or output by the operational risk monitor module 300 can be reported to a user of the autonomous vehicle. For example, the information reported to the user of the autonomous vehicle can include the operational risk determined using the inputs to the operational risk monitor module 300 and/or one or more of the outputs from the operational risk monitor module 300. The user of the autonomous vehicle may refer to the driver of the autonomous vehicle, a passenger of the autonomous vehicle, an owner or other registrant of the autonomous vehicle, or a person who manages the operation of the autonomous vehicle (e.g., at a remote operation center), or a third party observer, such as an insurance or governing authority agent who requires or requests data related to the operation of the autonomous vehicle.

In such an implementation, the communication interface 314 can be used for the reporting by transmitting the information to a user device of the user of the autonomous vehicle. Alternatively, or additionally, the onboard navigation module 318 can be used for reporting the information the user of the autonomous vehicle.

Figure 4:
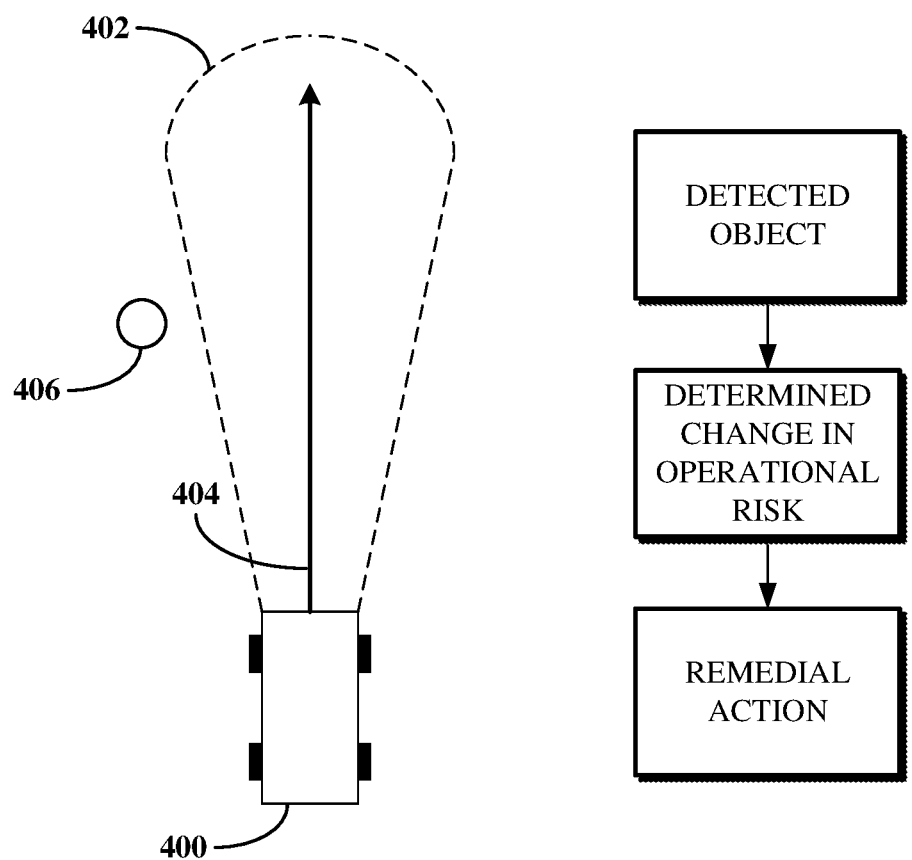
FIG. 4 is an illustration showing an example of a systematic monitor used by an operational risk monitor module.

FIG. 4 is an illustration showing an example of a systematic monitor used by an operational risk monitor module, which may, for example, be the operational risk monitor module 300 shown in FIG. 3. The systematic monitor represents functionality of the operational risk monitor module for determining an operational risk of an autonomous vehicle 400, which may, for example, be the autonomous vehicle 102 shown in FIG. 1, and determining whether and how to cause a change in the controlling of the autonomous vehicle 400 based on a comparison between the operational risk and a previous operational risk estimation.

The autonomous vehicle 400 is traveling in an environment. An iso-boundary operational risk range 402 represents the field of view of the sensors of the autonomous vehicle 400 (e.g., the sensors 104), which may cover a 360 degree rotation around a center point of the autonomous vehicle 400 so as to cover an area around the autonomous vehicle 400. A planned path 404 indicates the direction of travel of the autonomous vehicle 400. An object 406 (e.g., the object 110) is located nearby to the autonomous vehicle 400. The operational risk monitor module of the autonomous vehicle 400 detects the object 406 (e.g., a pedestrian) within the environment in which the autonomous vehicle 400 is located.

The operational risk monitor module determines a current operational risk for the autonomous vehicle 400 along the planned path 404 based on can be determined based on the detection of the object 406 and a prediction of how the object 406 will behave. For example, where the object 406 is a pedestrian, the object prediction may be a prediction of whether the pedestrian will walk in front of the autonomous vehicle 400. The operational risk monitor module compares the current operational risk against a previous operational risk estimation, which may, for example, have been determined one second earlier or another time earlier when the object 406 was farther from the autonomous vehicle 400.

If the current operational risk represents an increase from the previous operational risk estimation that exceeds a threshold, such that the previous operational risk estimation represents an operational risk underestimation, the systematic monitor of the operational risk monitor module determines a remedial action to perform to prevent a potential incident related to the predicted behavior of the object 406. The operational risk monitor module generates a signal usable by one or more control system modules of the autonomous vehicle 400 (e.g., the control system modules 106) to change a controlling of the autonomous vehicle 400.

Figure 5:
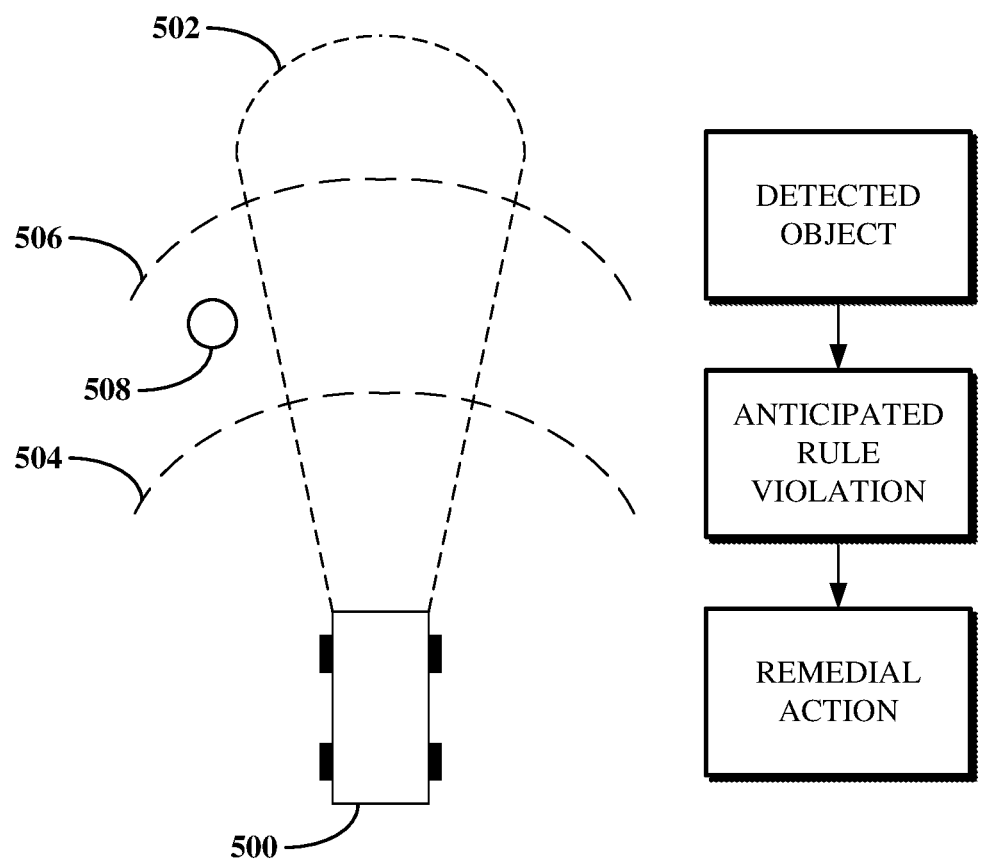
FIG. 5 is an illustration showing an example of a heuristic monitor used by an operational risk monitor module.

FIG. 5 is an illustration showing an example of a heuristic monitor used by an operational risk monitor module, which may, for example, be the operational risk monitor module 300 shown in FIG. 3. The heuristic monitor represents functionality of the operational risk monitor module for determining an operational risk of an autonomous vehicle 500, which may, for example, be the autonomous vehicle 102 shown in FIG. 1, and determining whether and how to cause a change in the controlling of the autonomous vehicle 500 based on whether the operational risk results in an anticipated rule violation.

The autonomous vehicle 500 is traveling in an environment. An iso-boundary operational risk range 502 represents the field of view of the sensors of the autonomous vehicle 500 (e.g., the sensors 104), which may cover a 360 degree rotation around a center point of the autonomous vehicle 500 so as to cover an area around the autonomous vehicle 500. A first distance 504 from the autonomous vehicle 500 and a second distance 506 from the autonomous vehicle 500 are each associated with different rules used by a systematic monitor of the operational risk monitor module. An object 508 (e.g., the object 110) is located nearby to the autonomous vehicle 500. The operational risk monitor module of the autonomous vehicle 500 detects the object 508 (e.g., a pedestrian) within the environment in which the autonomous vehicle 500 is located.

The operational risk monitor module detects the object 508 as being within the second distance 506 from the autonomous vehicle 500, but not within the first distance 504. A rule associated with the first distance 504 is thus not implicated; however, a rule associated with the second distance 506 is. The rule associated with the second distance 506 may indicate that if an operational risk determined for the autonomous vehicle 500 exceeds a threshold when a detected object (e.g., the object 508) is within the second distance 506, a remedial action should be executed to cause a change in the controlling of the autonomous vehicle 500.

The operational risk monitor module of the autonomous vehicle 500 determines an operational risk of the autonomous vehicle 500 based on the detection of the object 508 and a prediction of how the object 508 will behave. For example, where the object 508 is a pedestrian, the object prediction may be a prediction of whether the pedestrian will walk in front of the autonomous vehicle 500. The operational risk monitor module then determines whether the operational risk exceeds a threshold for the rule associated with the second distance 506.

If the operational risk exceeds the threshold for the rule associated with the second distance 506, the heuristic monitor of the operational risk monitor module determines a remedial action for execution to prevent a potential incident related to the predicted behavior of the object 508. The operational risk monitor module generates a signal usable by one or more control system modules of the autonomous vehicle 500 (e.g., the control system modules 106) to change a controlling of the autonomous vehicle 500.

Figure 6:
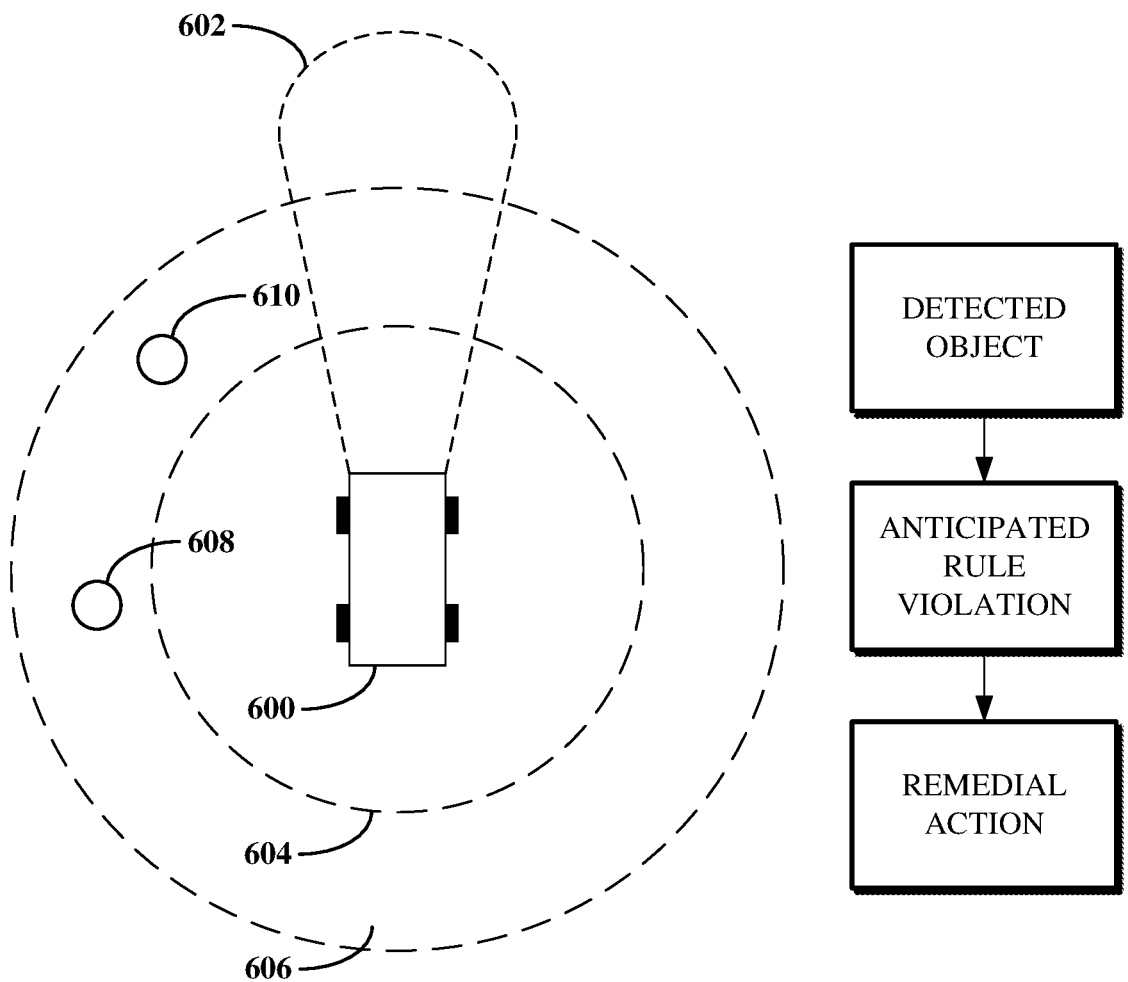
FIG. 6 is an illustration showing an example of an extended heuristic monitor used by an operational risk monitor module.

FIG. 6 is an illustration showing an example of an extended heuristic monitor used by an operational risk monitor module, which may, for example, be the operational risk monitor module 300 shown in FIG. 3. The extended heuristic monitor represents extended functionality of the heuristic monitor described with respect to FIG. 5, in which rules are violated by abnormal behaviors of objects within an environment in which an autonomous vehicle 600, which may, for example, be the autonomous vehicle 102 shown in FIG. 1, is located, regardless of whether an operational risk determined based on an object detection exceeds a threshold.

The autonomous vehicle 600 is traveling in an environment. An iso-boundary operational risk range 602 represents the field of view of the sensors of the autonomous vehicle 600 (e.g., the sensors 104), which may cover a 360 degree rotation around a center point of the autonomous vehicle 600 so as to cover an area around the autonomous vehicle 600. A first distance 604 from the autonomous vehicle 600 and a second distance 606 from the autonomous vehicle 600 are each associated with different rules used by a systematic monitor of the operational risk monitor module. A first object 608 and a second object 610 (e.g., each of which being the object 110 or another object) are each located nearby to the autonomous vehicle 600. The operational risk monitor module of the autonomous vehicle 600 detects the first object 608 and the second object 610 (e.g., one or both of which being a pedestrian) within the environment in which the autonomous vehicle 600 is located.

The operational risk monitor module detects the first object 608 and the second object 610 as each being within the second distance 606 from the autonomous vehicle 600, but not within the first distance 604. A rule associated with the first distance 604 is thus not implicated; however, a rule associated with the second distance 606 is. The rule associated with the second distance 606 may indicate that if a detected object (e.g., the first object 608 and/or the second object 610) is within the second distance 606 and performs an unexpected behavior, a remedial action should be executed to cause a change in the controlling of the autonomous vehicle 600.

The operational risk monitor module of the autonomous vehicle 600 determines whether either of the first object 608 or the second object 610 performs an unexpected behavior based on the detections of the first object 608 and the second object 610 and based on predictions of how the first object 608 and the second object 610 will behave. For example, where the first object 608 is a pedestrian and the second object 610 is a garbage can, the object prediction for the first object 608 may be a prediction of whether the pedestrian will walk in front of the autonomous vehicle 600 and the object prediction for the second object 610 may be a prediction that the garbage can will remain in place.

If the operational risk monitor module determines that the second object 610 has moved (e.g., based on next information indicating a detection of the second object 610 after a time at which the earlier detection of the second object 610 occurred), the heuristic monitor of the operational risk monitor module determines a remedial action to perform to prevent a potential incident related to the unexpected behavior of the second object 610. The operational risk monitor module generates a signal usable by one or more control system modules of the autonomous vehicle 600 (e.g., the control system modules 106) to change a controlling of the autonomous vehicle 600.

Figure 7:
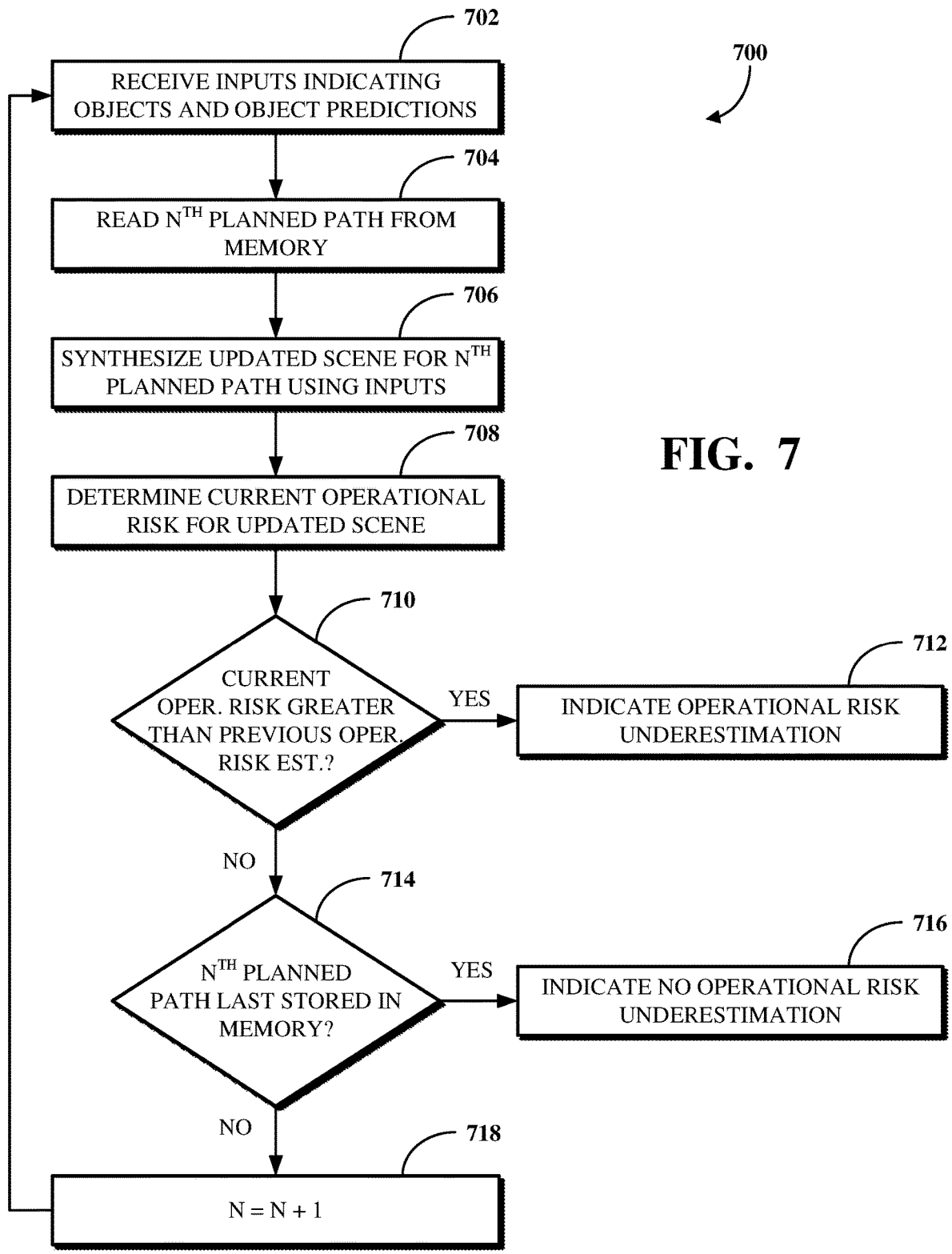
FIG. 7 is a flowchart showing an example of a technique for autonomous vehicle control based on a determined operational risk using systematic monitoring.
Figure 8:
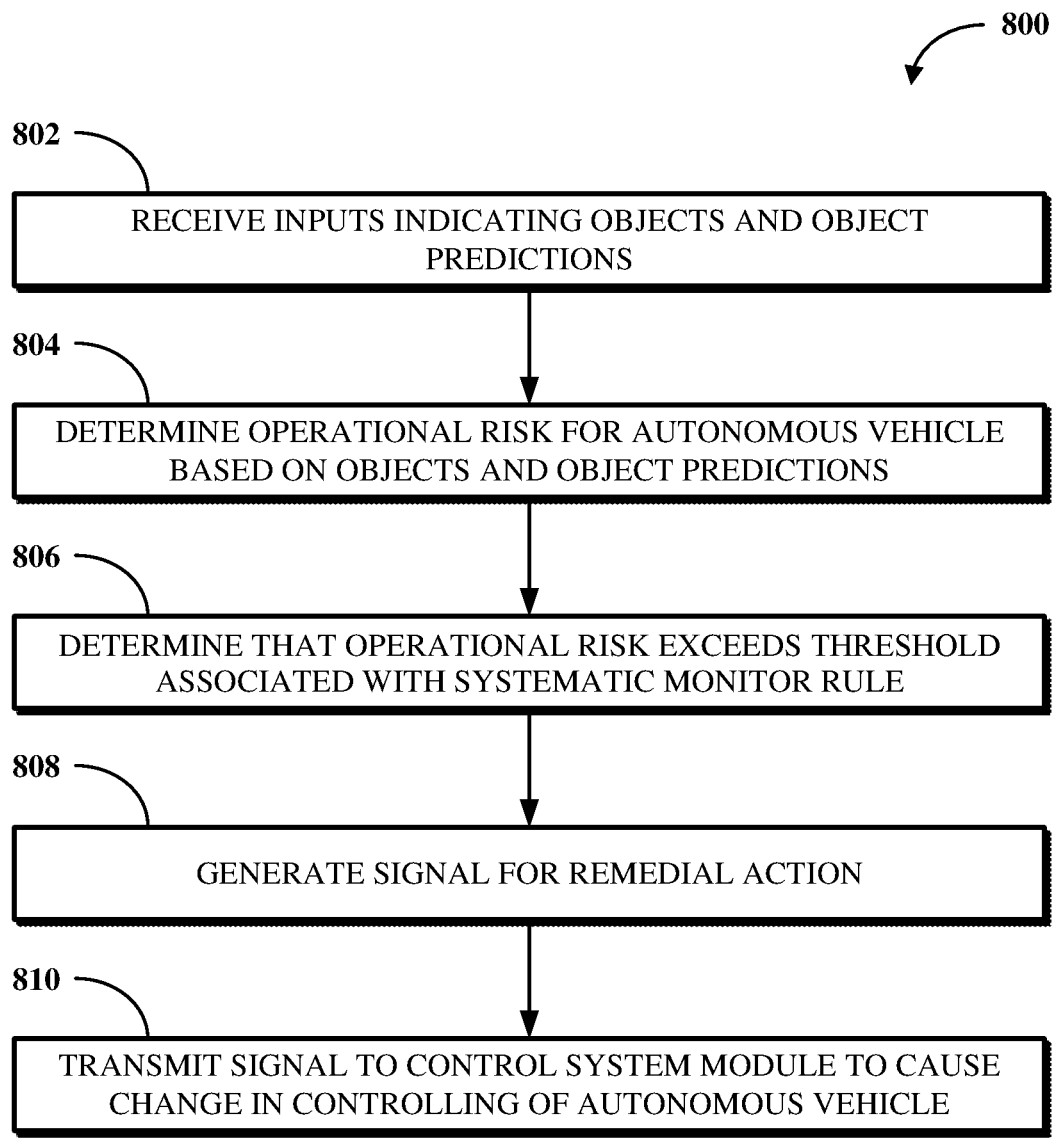
FIG. 8 is a flowchart showing an example of a technique for autonomous vehicle control based on a determined operational risk using heuristic monitoring.
Figure 9:
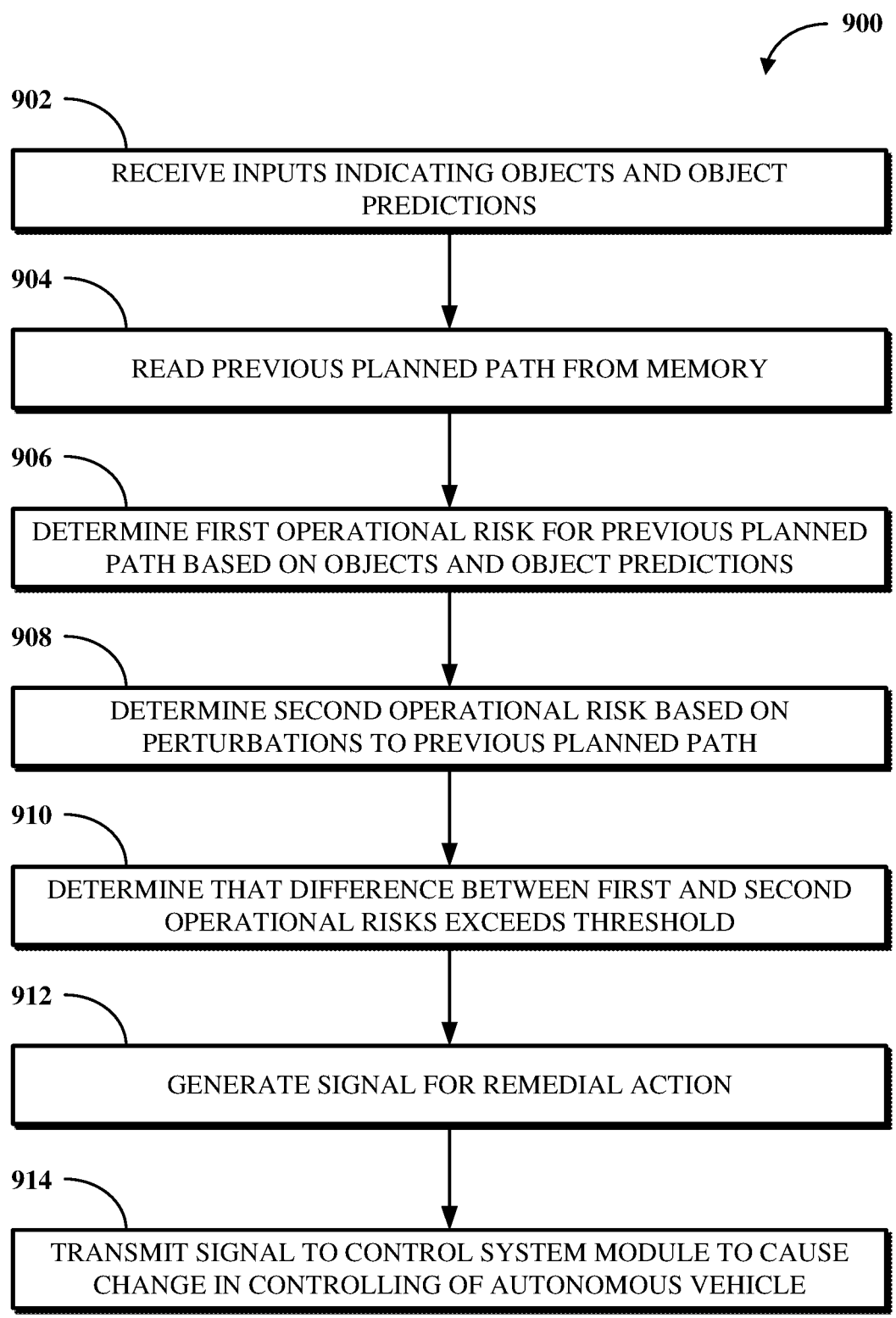
FIG. 9 is a flowchart showing an example of a technique for autonomous vehicle control based on a determined operational risk using sensitivity monitoring.

To further describe some implementations in greater detail, reference is next made to examples of techniques which may be performed by or using a system for operational risk assessment for autonomous vehicle control, such as described with respect to FIGS. 1-6. FIG. 7 is a flowchart showing an example of a technique 700 for autonomous vehicle control based on a determined operational risk using systematic monitoring. FIG. 8 is a flowchart showing an example of a technique 800 for autonomous vehicle control based on a determined operational risk using heuristic monitoring. FIG. 9 is a flowchart showing an example of a technique 900 for autonomous vehicle control based on a determined operational risk using sensitivity monitoring.

The technique 700, the technique 800, and/or the technique 900 can be executed using computing devices, such as the systems, hardware, and software described with respect to FIGS. 1-6. The technique 700, the technique 800, and/or the technique 900 can be performed, for example, by executing a machine-readable program or other computer-executable instructions, such as routines, instructions, programs, or other code. The steps, or operations, of the technique 700, the technique 800, the technique 900, or another technique, method, process, or algorithm described in connection with the implementations disclosed herein can be implemented directly in hardware, firmware, software executed by hardware, circuitry, or a combination thereof.

For simplicity of explanation, the technique 700, the technique 800, and the technique 900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for autonomous vehicle control based on a determined operational risk using systematic monitoring is shown. The technique 700 may, for example, represent operations performed at an operational risk monitor module (e.g., the operational risk monitor module 300 shown in FIG. 3) using systematic monitoring.

At 702, input information is received. The input information indicates one or more objects detected within an environment in which the autonomous vehicle is located and one or more object predictions representing expected behaviors of the one or more objects. The input information may, for example, be received from one or more control system modules of the autonomous vehicle. For example, the one or more objects may be detected using a perception module that processes information measured or otherwise recorded using sensors of the autonomous vehicle. In another example, the one or more object predictions may be determined using a prediction module that processes the detected objects based on expected behaviors of those detected objects.

At 704, a planned path, referred to as the Nth planned path, is identified. Identifying the Nth planned path includes reading the Nth planned path from memory. For example, the Nth planned path can be identified by retrieving data associated with the Nth planned path from a buffer (e.g., the memory buffer 316 shown in FIG. 3). The Nth planned path represents an intended sequence of actions used for the autonomous vehicle to travel within the environment in which the autonomous vehicle is located. The planned path is one of a number of planned path candidates stored in the buffer. The planned path candidates include planned paths which have been selected (e.g., by the planning module 306) as winning path candidates. The planned path candidates can also include planned paths which were determined (e.g., by the planning module 306) as being non-winning path candidates. For example, a number of planned path candidates may be evaluated at a given processing instant to select one of those planned path candidates as a winning path candidate, such as based on the winning path candidate having a highest probability of safety or a lowest probability of risk. The other planned path candidates which were not selected as the winning path candidate are non-winning path candidates.

At 706, an updated scene for the Nth planned path is synthesized using the input information. The updated scene for the Nth planned path refers to an understanding of the environment in which the autonomous vehicle is located as the autonomous vehicle travels along the Nth planned path, according to the newly detected objects within that environment and the newly predicted behaviors of those detected objects. For example, the Nth planned path may be a planned path which has already been evaluated using an operational risk monitor module as described herein. During such prior evaluation, a scene for the Nth planned path may have been synthesized based on then-detected objects and then-predicted behaviors of those objects. Now, based on the newly detected objects and newly predicted behaviors of those objects, the updated scene can be synthesized by applying the Nth planned path to the environment in which the autonomous vehicle is located. In this way, the scene previously synthesized for the Nth planned path is updated according to the newly detected objects and the newly predicted behaviors of those objects. In some cases, the updated scene can be synthesized by projecting behaviors of the detected objects according to the object predictions against the Nth planned path, such as to predict a relationship between the expected behaviors of the detected objects and the autonomous vehicle as the autonomous vehicle travels along the Nth planned path.

At 708, an operational risk is determined for the updated scene. Determining the operational risk can include retrieving a cost value for the updated scene, such as based on the input information and based on the Nth planned path. For example, a cost function can be called to retrieve the cost value, for example, from a control system module of the autonomous vehicle. Alternatively, the cost value can be determined as part of the operations for determining the operational risk, for example, where the control system modules are not used to determine or otherwise maintain cost value information.

The operational risk represents a probability that the autonomous vehicle will encounter an event by continuing to travel along the Nth planned path based on the detected objects and object predictions. The operational risk further represents a severity of the event, for example, based on the type of event and the expected location and behavior of the event. The operational risk is determined using the cost value. For example, the cost value can be a value associated with the updated scene information. A deterministic risk framework or other modeling is used to identify cost values for different scenes based on the relationships between the detected objects, the expected behaviors of those objects, and the planned path.

At 710, a determination is made as to whether the operational risk is greater than a previous operational risk estimation. The previous operational risk estimation is an estimation of operational risk determined for a N−1th planned path. For example, the Nth planned path may represent a planned path determined some amount of time (e.g., one hundredth of a second) after the N−1th planned path was determined. The Nth planned path may therefore represent the planned path of the autonomous vehicle some amount of time after the N−1th planned path. The previous operational risk estimation may be stored in a buffer (e.g., the memory buffer 316). Determining whether the operational risk is greater than the previous operational risk estimation may include retrieving the previous operational risk estimation from memory and comparing the retrieved operational risk against the operational risk. The determination as to whether the operational risk is greater than the previous operational risk estimation is used to indicate whether an operational risk underestimation occurred. That is, where the operational risk is greater than the previous operational risk estimation, a determination can be made that the previous operational risk estimation is too low.

At 712, where a determination is made that the operational risk is greater than the previous operational risk estimation, such that there is an operational risk underestimation, a signal is generated to indicate the operational risk underestimation. The signal is transmitted to one or more control system modules to cause a change in the controlling of the autonomous vehicle. For example, the signal can be transmitted to cause one or more control system modules of the autonomous vehicle to control the autonomous vehicle by performing a remedial action to prevent the autonomous vehicle from encountering an event associated with the operational risk.

At 714, where a determination is made that the operational risk is not greater than the previous operational risk estimation, a determination is made as to whether the Nth planned path is the last planned path stored in memory. For example, where the Nth planned path is identified by retrieving data associated with the Nth planned path from a buffer (e.g., the memory buffer 316), determining whether the Nth planned path is the last planned path includes determining whether the memory buffer 316 stores data associated with a planned path which has not yet been considered using the technique 700.

At 716, where the Nth planned path is the last planned path stored in memory, a signal is generated to indicate that there is no underestimation in operational risk as represented by the previous operational risk estimate. The signal is transmitted to one or more control system modules to allow the autonomous vehicle to maintain a safe state of the autonomous vehicle, for example, by allowing the autonomous vehicle to continue traveling along its current planned path.

At 718, where the Nth planned path is not the last planned path stored in memory, the value of N is increased by one. The technique 700 then returns to 702 where new input information indicating objects and object predictions is received, and then to 704 where a planned path corresponding to the new value of N is read from memory (e.g., retrieved from the buffer). In some cases, the objects and object predictions of the new input information may be the same as the objects and object predictions of the input information used to process the planned path at the previous value of N. In some such cases, the objects and object predictions of the new input information may not be exactly the same as the objects and object predictions of the input information used to process the planned path at the previous value of N, but may nonetheless not be significantly different.

In some implementations, the signals generated at 712 or at 716 may indicate a value of a risk underestimation flag. For example, the risk underestimation flag may have a first value where an operational risk underestimation represented within the previous operational risk estimation is determined and a second value where no such underestimation is determined. The control system modules which receive the signal indicating the value of the risk underestimation flag can use the value of the flag indicated within the signal to determine whether to cause a change in the controlling of the autonomous vehicle. In some implementations, a signal is not generated to indicate that no operational risk increase is determined. For example, at 716, the technique 700 may simply end rather than generate a signal.

In some implementations, determining whether the Nth operational risk is greater than the previous operational risk estimation includes determining whether the Nth operational risk exceeds a threshold. For example, even where the Nth operational risk is greater than the previous operational risk estimation (e.g., where the previous operational risk estimation is zero), the Nth operational risk may still not be great enough to merit the performance of a remedial action to cause a change in the controlling of the autonomous vehicle. In some such implementations, the threshold may be configurable. For example, subsequent modeling performed using information processed to determine the Nth operational risk can be used to determine that the threshold should be changed.

In some implementations, the technique 700 can include selecting the planned path from a list of candidate planned paths. For example, each of the candidate planned paths may be a planned path identified using a control system module (e.g., the planning module 306). The candidate planned paths may be evaluated based on an instantaneous operational risk limit defining a maximum acceptable operational risk at a given instance along the candidate planned paths. For example, the candidate planned path having the lowest probability of exceeding the instantaneous operational risk limit can be selected as the planned path. As such, the selection of a planned path may be constrained according to an instantaneous operational risk limit. In some such implementations, new candidate planned paths can be generated until the operational risk for a selected planned path is less than or equal to the instantaneous operational risk limit.

Referring next to FIG. 8, the technique 800 for autonomous vehicle control based on a determined operational risk using heuristic monitoring is shown. The technique 800 may, for example, represent operations performed at an operational risk monitor module (e.g., the operational risk monitor module 300 shown in FIG. 3) using heuristic monitoring.

At 802, input information is received. The input information indicates one or more objects detected within an environment in which the autonomous vehicle is located and one or more object predictions representing expected behaviors of the one or more objects. The input information may, for example, be received from one or more control system modules of the autonomous vehicle. For example, the one or more objects may be detected using a perception module that processes information measured or otherwise recorded using sensors of the autonomous vehicle. In another example, the one or more object predictions may be determined using a prediction module that processes the detected objects based on expected behaviors of those detected objects.

At 804, a current operational risk is determined for the autonomous vehicle based on the input information. Determining the current operational risk can include identifying a rule which is implicated by the detected objects and the object predictions. For example, one or more rules for controlling the autonomous vehicle based on the presence of certain objects and the prediction of certain behaviors of those objects may be used to determine the current operational risk for the autonomous vehicle.

Data indicating the object or objects detected within the environment in which the vehicle is located can be used to identify the rule to use for determining the current operational risk. For example, data associated with the rule (e.g., including the rule definition, conditions for using the rule, cost functions or inputs thereto, etc.) can be stored in a database or other data store. The rule can be retrieved from the database or other data store using a query or other request indicating the objects and/or the object predictions.

The rule is a rule used by systematic monitor functionality of the operational risk monitor module. For example, the rule can be a configuration or definition of the autonomous vehicle, the environment in which the autonomous vehicle is located, or both, which triggers the systematic monitor to determine that a remedial action needs to be performed. For example, the rule can be a rule indicating to perform an emergency stop of the autonomous vehicle if a pedestrian or other living being is first detected within a defined distance of the front of the autonomous vehicle based on input information. There may be a number of rules used for different types of control of the autonomous vehicle. The rules may be defined at the time in which the operational risk monitor module is deployed within the autonomous vehicle. Alternatively, some or all of the rules may be configurable, for example, by a user of the autonomous vehicle.

The current operational risk represents a probability that the autonomous vehicle will encounter an event by continuing to travel within the environment in which the autonomous vehicle is located, such as based on the detected objects and object predictions. The current operational risk is determined using a cost value. For example, the cost value can be a value calculated by applying values representative of the objects and/or the object predictions to a cost function. A deterministic risk framework or other modeling is used to identify cost values for different scenes based on the relationships between the detected objects, the expected behaviors of those objects, and the relevant rules.

At 806, a determination is made as to whether the current operational risk exceeds a threshold associated with the rule used to determine the current operational risk. For example, the rule used to determine the current operational risk can indicate a threshold representing a maximum acceptable risk for the autonomous vehicle before controlling the autonomous vehicle using a remedial action.

At 808, responsive to a determination that the current operational risk exceeds the threshold associated with the rule, a signal indicating or otherwise used to indicate a remedial action to perform is generated. The remedial action may be specified based on the rule. For example, where the rule is used for situations where pedestrians are detected in front of the autonomous vehicle and are expected to remain in front of the autonomous vehicle, the remedial actions available for the autonomous vehicle to perform may be limited to an emergency stop. Alternatively, the remedial action may be one of a number of remedial actions selected using the operational risk monitor module.

For example, the particular remedial action to perform can be selected using a deterministic risk framework indicating a most effective or otherwise most useful remedial action to perform given the current operational cost and given the detected objects and predicted object behaviors. In another example, the particular remedial action to perform can be selected based on the particular value of the current operational risk. For example, each of the available remedial actions can be associated with a range of operational risks. The operational risk monitor module can output a signal (e.g., including a value of a flag and/or other data) used by one or more control system modules of the autonomous vehicle to select the remedial action. Alternatively, the operational risk monitor module can select the remedial action having a range which includes the current operational risk.

At 810, the signal indicating or otherwise used to indicate the remedial action is transmitted to one or more control system modules to cause a change in the controlling of the autonomous vehicle. For example, the signal can be transmitted to cause one or more control system modules of the autonomous vehicle to control the autonomous vehicle by performing the remedial action to prevent the autonomous vehicle from encountering an event associated with the current operational risk. For example, a flag received from the operational risk monitor module can be used by a perception module to adjust a confidence in a prediction for the autonomous vehicle. In another example, a flag received from the operational risk monitor module can be used by a planning module to reduce a speed operation of the autonomous vehicle.

In some implementations, the heuristic monitoring described with respect to the technique 800 can be extended heuristic monitoring. For example, the rules used by the technique 800 may generally be rules used to determine operational risks based on the detection of objects and the prediction of object behaviors nearby the front of the autonomous vehicle while the autonomous vehicle travels forward. However, extended heuristic monitoring may instead use rules which consider objects and object predictions within any direction of the autonomous vehicle regardless of travel direction. For example, an extended heuristic monitor may indicate to slow down or stop the autonomous vehicle when input information indicates behavior which can result in an identification of an underestimation of a previous operational risk estimate, such as based on a first detection of an unobstructed pedestrian within some distance (e.g., two meters) in any direction of the autonomous vehicle. In another example, an extended heuristic monitor may indicate to keep a speed low when traffic conditions on a freeway are high and the autonomous vehicle is generally surrounded by slow moving traffic.

In some implementations, the technique 800 can include selecting the planned path from a list of candidate planned paths. For example, each of the candidate planned paths may be a planned path identified using a control system module (e.g., the planning module 306). The candidate planned paths may be evaluated based on an instantaneous operational risk limit defining a maximum acceptable operational risk at a given instance along the candidate planned paths. For example, one of the candidate planned paths having operational risk that does not exceed the instantaneous operational risk limit can be selected as the planned path, which may be the candidate planned path having the greatest operational risk without exceeding the instantaneous operational risk limit. As such, the selection of a planned path may be constrained according to an instantaneous operational risk limit. In some such implementations, new candidate planned paths can be generated until the operational risk for a selected planned path is less than or equal to the instantaneous operational risk limit.

Referring next to FIG. 9, the technique 900 for autonomous vehicle control based on a determined operational risk using sensitivity monitoring is shown. The technique 900 may, for example, represent operations performed at an operational risk monitor module (e.g., the operational risk monitor module 300 shown in FIG. 3) using sensitivity monitoring.

At 902, input information is received. The input information indicates one or more objects detected within an environment in which the autonomous vehicle is located and one or more object predictions representing expected behaviors of the one or more objects. The input information may, for example, be received from one or more control system modules of the autonomous vehicle. For example, the one or more objects may be detected using a perception module that processes information measured or otherwise recorded using sensors of the autonomous vehicle. In another example, the one or more object predictions may be determined using a prediction module that processes the detected objects based on expected behaviors of those detected objects.

At 904, a previous planned path is identified. Identifying the previous planned path includes reading the previous planned path from memory. For example, the previous planned path can be identified by retrieving data associated with the previous planned path from a buffer (e.g., the memory buffer 316 shown in FIG. 3). The previous planned path represents an intended sequence of actions used for the autonomous vehicle to travel within the environment in which the autonomous vehicle is located. The previous planned path is a planned path which has already been evaluated using the control system modules of the autonomous vehicle (e.g., by the planning module 306).

At 906, a first operational risk is determined for the autonomous vehicle based on the input information and based on the previous planned path. Determining the first operational risk can include synthesizing an updated scene for the previous planned path, for example, by updating a previously synthesized scene for the previous planned path according to the newly detected one or more objects from the input information and according to the newly predicted one or more object predictions from the input information. A cost value can then be retrieved for the updated scene, such as based on the input information and based on the previous planned path. For example, a cost function can be called to retrieve the cost value, for example, from a control system module of the autonomous vehicle. Alternatively, the cost value can be determined as part of the operations for determining the operational risk, for example, where the control system modules are not used to determine or otherwise maintain cost value information.

At 908, a second operational risk is determined for the autonomous vehicle based on the input information and based on perturbations to the previous planned path. The perturbations to the previous planned path represent changes to one or more aspects of the previous planned path, for example, adjustments to one or more actions of the intended sequence of actions represented by the previous planned path. In some cases, the perturbations may be minor, for example, by adjusting a speed of the autonomous vehicle by a small amount (e.g., increasing or decreasing the speed of the autonomous vehicle by less than 0.5 miles or kilometers per hour). In other cases, the perturbations may be major, for example, by causing an emergency stop of the autonomous vehicle or by causing the autonomous vehicle to make a turn.

The first and second operational risks each represents a probability that the autonomous vehicle will encounter an event by continuing to travel along the previous planned path based on the detected objects and object predictions. The first and second operational risks are determined using the cost values. For example, the cost value can be a value associated with the updated scene information. A deterministic risk framework or other modeling is used to identify cost values for different scenes based on the relationships between the detected objects, the expected behaviors of those objects, and the planned path.

At 910, a determination is made that a difference between the first and second operational risk exceeds an operational risk sensitivity threshold. The operational risk sensitivity threshold represents a maximum acceptable amount of change to the operational risk of the autonomous vehicle based on the perturbations introduced to the previous planned path.

At 912, responsive to a determination that the difference between the first and second operational risk exceeds an operational risk sensitivity threshold, a signal indicating or otherwise used to indicate a remedial action to perform is generated. For example, the particular remedial action to perform can be selected using a deterministic risk framework indicating a most effective or otherwise most useful remedial action to perform given the current operational cost and given the detected objects and predicted object behaviors. In another example, the particular remedial action to perform can be selected based on the particular value of the first operational risk, based on the particular value of the second operational risk, or based on the particular value of the difference between the first and second operational risks. For example, each of the available remedial actions can be associated with a range of operational risks. The operational risk monitor module can output a signal (e.g., including a value of a flag and/or other data) used by one or more control system modules of the autonomous vehicle to select the remedial action. Alternatively, the operational risk monitor module can select the remedial action having a range which includes the current operational risk.

At 914, the signal indicating or otherwise used to indicate the remedial action is transmitted to one or more control system modules to cause a change in the controlling of the autonomous vehicle. For example, the signal can be transmitted to cause one or more control system modules of the autonomous vehicle to control the autonomous vehicle by performing the remedial action to prevent the autonomous vehicle from encountering an event associated with the current operational risk. For example, a flag received from the operational risk monitor module can be used by a perception module to adjust a confidence in a prediction for the autonomous vehicle. In another example, a flag received from the operational risk monitor module can be used by a planning module to reduce a speed operation of the autonomous vehicle.

In some implementations, the technique 900 can include selecting the previous planned path from a list of candidate planned paths. For example, each of the candidate planned paths may be a planned path identified using a control system module (e.g., the planning module 306). The candidate planned paths may be evaluated based on an instantaneous operational risk limit defining a maximum acceptable operational risk at a given instance along the candidate planned paths. For example, one of the candidate planned paths having operational risk that does not exceed the instantaneous operational risk limit can be selected as the planned path, which may be the candidate planned path having the greatest operational risk without exceeding the instantaneous operational risk limit. As such, the selection of a planned path may be constrained according to an instantaneous operational risk limit. In some such implementations, new candidate planned paths can be generated until the operational risk for a selected planned path is less than or equal to the instantaneous operational risk limit.

Figure 10:
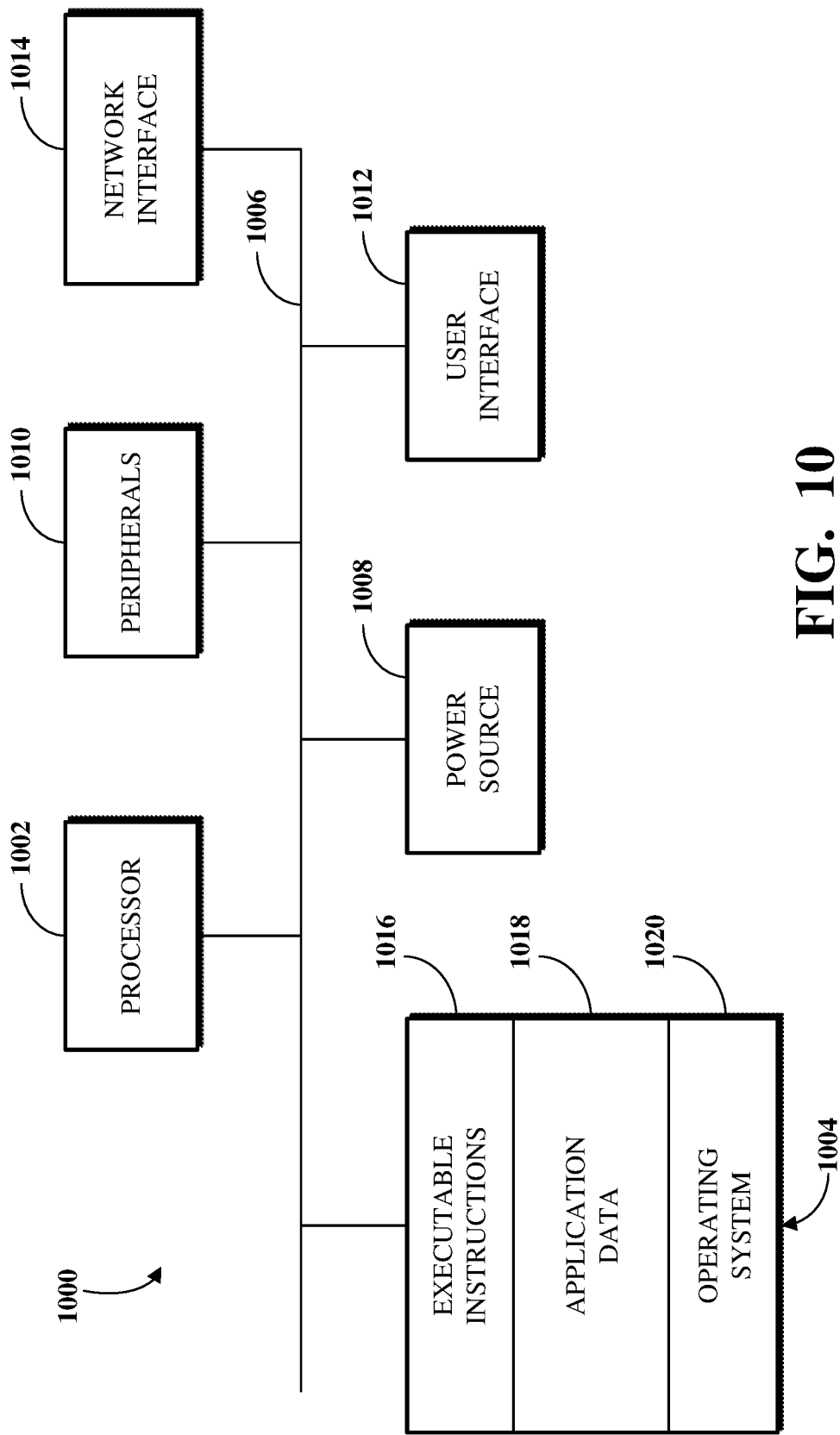
FIG. 10 is a block diagram showing an example of a computing device which may be used in a system for operational risk assessment for autonomous vehicle control.

FIG. 10 is a block diagram showing an example of a computing device 1000 which may be used in a system for operational risk assessment for autonomous vehicle control, for example, the system 100 shown in FIG. 1. The computing device 1000 may be used to implement a computer that runs or otherwise performs functionality of an operational risk monitor module, for example, the operational risk monitor module 108. Alternatively, the computing device 1000 may be used to implement a single computer used to run or otherwise perform functionality of both the operational risk monitor module and control system modules, for example, the control system modules 106. As a further alternative, the computing device 1000 may otherwise be used to implement one or more computers according to implementations of this disclosure.

The computing device 1000 includes components or units, such as a processor 1002, a memory 1004, a bus 1006, a power source 1008, peripherals 1010, a user interface 1012, and a network interface 1014. One of more of the memory 1004, the power source 1008, the peripherals 1010, the user interface 1012, or the network interface 1014 can communicate with the processor 1002 using the bus 1006.

The processor 1002 is a central processing unit, such as a microprocessor, and can include single or multiple processors having single or multiple processing cores. Alternatively, the processor 1002 can include another type of device, or multiple devices, now existing or hereafter developed, configured for manipulating or processing information. For example, the processor 1002 can include multiple processors interconnected in any manner, including hardwired or networked, including wirelessly networked. For example, the operations of the processor 1002 can be distributed across multiple devices or units that can be coupled directly or across a local area or other suitable type of network. The processor 1002 can include a cache, or cache memory, for local storage of operating data or instructions.

The memory 1004 includes one or more memory components, which may each be volatile memory or non-volatile memory. For example, the volatile memory of the memory 1004 can be random access memory (RAM) (e.g., a DRAM module, such as DDR SDRAM) or another form of volatile memory. In another example, the non-volatile memory of the memory 1004 can be a disk drive, a solid state drive, flash memory, phase-change memory, or another form of non-volatile memory configured for persistent electronic information storage. The memory 1004 may also include other types of devices, now existing or hereafter developed, configured for storing data or instructions for processing by the processor 1002.

The memory 1004 can include data for immediate access by the processor 1002. For example, the memory 1004 can include executable instructions 1016, application data 1018, and an operating system 1020. The executable instructions 1016 can include one or more application programs, which can be loaded or copied, in whole or in part, from non-volatile memory to volatile memory to be executed by the processor 1002. For example, the executable instructions 1016 can include instructions for performing some or all of the techniques of this disclosure. The application data 1018 can include user data, database data (e.g., database catalogs or dictionaries), or the like. The operating system 1020 can be, for example, Microsoft Windows®, Mac OS X®, or Linux®; an operating system for a small device, such as a smartphone or tablet device; or an operating system for a large device, such as a mainframe computer.

The power source 1008 includes a source for providing power to the computing device 1000. For example, the power source 1008 can be an interface to an external power distribution system. In another example, the power source 1008 can be a battery, such as where the computing device 1000 is a mobile device or is otherwise configured to operate independently of an external power distribution system.

The peripherals 1010 includes one or more sensors, detectors, or other devices configured for monitoring the computing device 1000 or the environment around the computing device 1000. For example, the peripherals 1010 can include a geolocation component, such as a global positioning system location unit. In another example, the peripherals can include a temperature sensor for measuring temperatures of components of the computing device 1000, such as the processor 1002.

The user interface 1012 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 1014 provides a connection or link to a network (e.g., the network 114 shown in FIG. 1). The network interface 1014 can be a wired network interface or a wireless network interface. The computing device 1000 can communicate with other devices via the network interface 1014 using one or more network protocols, such as using Ethernet, TCP, IP, power line communication, Wi-Fi, Bluetooth, infrared, GPRS, GSM, CDMA, Z-Wave, ZigBee, another protocol, or a combination thereof.

Implementations of the computing device 1000 may differ from what is shown and described with respect to FIG. 9. In some implementations, the computing device 1000 can omit the peripherals 1010. In some implementations, the memory 1004 can be distributed across multiple devices. For example, the memory 1004 can include network-based memory or memory in multiple clients or servers performing the operations of those multiple devices. In some implementations, the application data 1018 can include functional programs, such as a web browser, a web server, a database server, another program, or a combination thereof.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc.

Likewise, the terms "system" or "module" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for controlling an autonomous vehicle based on an operational risk determined for the autonomous vehicle, the method comprising:

receiving input information indicating one or more objects detected within an environment in which the autonomous vehicle is located and one or more object predictions representing expected behaviors of the one or more objects;

identifying a planned path representing an intended sequence of actions for the autonomous vehicle to travel within the environment in which the autonomous vehicle is located;

determining the operational risk for the autonomous vehicle based on the input information and based on the planned path, the operational risk representing a probability that the autonomous vehicle will encounter an event;

determining whether the operational risk for the autonomous vehicle is greater than a previous operational risk estimation for the autonomous vehicle, the previous operational risk estimation representing an operational risk estimation for the autonomous vehicle based on the planned path and based on previous input information;

responsive to determining that the operational risk for the autonomous vehicle is greater than the previous operational risk estimation, generating a signal used for controlling the autonomous vehicle; and transmitting the signal to one or more control system modules of the autonomous vehicle to cause the one or more control system modules to control the autonomous vehicle by performing a remedial action to prevent the autonomous vehicle from encountering the event.

2. The method of claim 1, wherein the signal is a first signal, wherein the method further comprises:

responsive to determining that the operational risk for the autonomous vehicle is less than or equal to the previous operational risk estimation, determining whether the planned path is a last planned path available for the autonomous vehicle;

responsive to determining that the planned path is the last planned path available for the autonomous vehicle, generating a second signal used for controlling the autonomous vehicle; and transmitting the second signal to one or more control system modules of the autonomous vehicle to cause the one or more control system modules to control the autonomous vehicle by maintaining a safe state.

3. The method of claim 2, wherein the first signal indicates a risk underestimation, wherein the controlling of the autonomous vehicle according to the first signal causes the autonomous vehicle to come to a emergency stop.

4. The method of claim 2, wherein identifying the planned path representing the intended sequence of actions used for the autonomous vehicle to travel within the environment in which the autonomous vehicle is located comprises:

retrieving data indicative of the planned path from a buffer, wherein the buffer stores data indicative of winning path candidates and non-winning path candidates.

5. The method of claim 1, wherein determining whether the operational risk for the autonomous vehicle is greater than the previous operational risk for the autonomous vehicle comprises:

determining whether the operational risk exceeds a threshold representing a maximum acceptable risk for the autonomous vehicle.

6. The method of claim 1, wherein determining the operational risk for the autonomous vehicle based on the input information and based on the planned path comprises:

synthesizing updated scene information for the autonomous vehicle based on the planned path and based on the input information; and determining the operational risk for the autonomous vehicle using the updated scene information.

7. The method of claim 6, wherein synthesizing the updated scene information for the autonomous vehicle based on the planned path and based on the input information comprises:

update a scene previously determined for the planned path using the previous input information according to the one or more objects detected within the environment in which the autonomous vehicle is located and according to the one or more object predictions representing the expected behaviors of the one or more objects, wherein the previous input information includes objects previously detected within the environment in which the autonomous vehicle is located and object predictions previously predicted for the previously detected objects.

8. The method of claim 6, wherein determining the operational risk for the autonomous vehicle using the updated scene information comprises:

retrieving a cost value associated with the updated scene information from the one or more control system modules, wherein the cost value indicates the operational risk for the autonomous vehicle.

9. The method of claim 1, wherein the signal is one of a plurality of signals generated in connection with the operational risk, wherein the plurality of signals further includes a signal including a perception incident flag and a signal including a prediction incident flag, wherein the perception incident flag indicates that one of the one or more objects detected within the environment in which the autonomous vehicle is located presents a first incident risk to the autonomous vehicle, wherein the prediction incident flag indicates that an expected behavior of the one of the one or more objects detected within the environment in which the autonomous vehicle is located presents a second incident risk to the autonomous vehicle.

10. A system for controlling an autonomous vehicle based on an operational risk determined for the autonomous vehicle, the system comprising:

an first software aspect configured to receive information from control system modules of the autonomous vehicle and use the information to determine an operational risk for the autonomous vehicle along a planned path and to indicate a remedial action for performance using one or more of the control system modules based on the operational risk and based on a previous operational risk estimation for the planned path; and a memory buffer allocated within a memory of a computing device running the first software aspect, wherein the memory buffer stores the information received from the control system modules, information indicative of previous operational risk estimations determined using the first software aspect, and information indicative of scenes previously synthesized for the planned path, wherein the information received from the control system modules includes information indicative of one or more objects detected within an environment in which the autonomous vehicle is located, information indicative of one or more object predictions representing expected behaviors of the one or more objects, and information indicative of one or more planned paths including the planned path, and wherein the first software aspect determines the operational risk for the autonomous vehicle along the planned path by updating a scene previously synthesized for the planned path according to the one or more objects and according to the one or more object predictions.

11. The system of claim 10, wherein the first software aspect includes an object risk comparator, an object prediction risk comparator, and a planned path comparator,
wherein the object risk comparator uses the information indicative of the one or more detected objects to output a first signal indicating whether the one or more detected objects present a greater risk to the autonomous vehicle than objects previously detected within the environment in which the autonomous vehicle is located,
wherein the object prediction risk comparator uses the information indicative of the one or more object predictions to output a second signal indicating whether the one or more object predictions present a greater risk to the autonomous vehicle than object predictions for the objects previously detected within the environment in which the autonomous vehicle is located, and
wherein the planned path comparator uses the information indicative of the one or more planned path to output a third signal indicating whether the planned path is different from other planned paths of the one or more planned paths.

12. The system of claim 11, wherein the first software aspect further includes an operational risk processor that uses the first signal, the second signal, and the third signal to determine the operational risk and to generate a signal used to change at least one action.

13. The system of claim 11, wherein one or both of the object risk comparator or the object prediction risk comparator uses one or more configurable rules, wherein the one or more configurable rules available to the object risk comparator are rules for determining risks associated with the one or more detected objects, wherein the one or more configurable rules available to the object prediction risk comparator are rules for determining risks associated with the one or more object predictions.

14. The system of claim 11, wherein the control system modules include a second software aspect and a third software aspect, wherein the second software aspect is configured to generate the information indicative of the one or more detected objects, and the third software aspect is configured to generate the information indicative of the one or more object predictions is generated,
wherein the first signal includes a perception incident flag and is transmitted to the second software aspect, wherein the second signal includes a prediction incident flag and is transmitted to the third software aspect.

15. The system of claim 10, wherein the remedial action is an emergency stop, wherein the first software aspect generates a signal indicating a control abort command for performing the emergency stop, wherein the signal indicating the control abort command is transmitted to a platform control module of the control system modules.

16. The system of claim 10, wherein one or more of the control system modules are also run on the computing device running the first software aspect.

17. An apparatus for controlling an autonomous vehicle based on an operational risk determined for the autonomous vehicle, the apparatus comprising:

a memory, wherein a first portion of the memory stores instructions and a second portion of the memory is allocated for a buffer; and
a processor that executes the instructions stored in the memory to:
determine an operational risk for the autonomous vehicle along a planned path representative of an intended sequence of actions for the autonomous vehicle to travel within an environment in which the autonomous vehicle is located;
retrieve data indicative of a previous operational risk estimation for the planned path from the buffer;
compare the operational risk against the previous operational risk estimation to determine whether the operational risk is greater than the previous operational risk;
responsive to a determination that the operational risk is greater than the previous operational risk, generate a signal indicating an operational risk underestimation; and
transmit the signal to a control system module of the autonomous vehicle to cause the control system module to perform a remedial action to prevent an encounter with an event associated with the operational risk.

18. The apparatus of claim 17, wherein the instructions to determine the operational risk for the autonomous vehicle along the planned path representing the intended sequence of actions for the autonomous vehicle to travel within the environment in which the autonomous vehicle is located include instructions to:
use information indicative of one or more objects detected within the environment in which the autonomous vehicle is located and information indicative of one or more object predictions representative of expected behaviors of the one or more objects, wherein the information indicative of the one or more objects is received from a second software aspect of the autonomous vehicle configured to generate the information indicative of the one or more detected objects, wherein the information indicative of the one or more object predictions is received from a third software of the autonomous vehicle configured to generate the information indicative of the one or more object predictions is generated.

19. The apparatus of claim 17, wherein the signal is a first signal, wherein the instructions include instructions to:
responsive to a determination that the operational risk is less than or equal to the previous operational risk estimation, determine whether the planned path is a last planned path stored in the buffer;
responsive to a determination that the planned path is a last planned path stored in the buffer:
generate a second signal indicating to allow the autonomous vehicle to travel along the planned path; and
transmit the second signal to the first software aspect of the autonomous vehicle to cause the first software aspect to allow the autonomous vehicle to travel along the planned path; and
responsive to a determination that the planned path is not a last planned path stored in the buffer:
retrieve data indicative of a next planned path from the buffer; and
store data indicative of the operational risk within the buffer for use in determining a new operational risk for the autonomous vehicle along the next planned path.

20. The apparatus of claim 17, wherein the instructions include instructions to:
- evaluate a number of candidate planned paths using an instantaneous operational risk limit; and
- select, as the planned path, the candidate planned path having a lowest probability of exceeding the instantaneous operational risk limit.

* * * * *